(12) United States Patent
Horikoshi et al.

(10) Patent No.: US 6,456,405 B2
(45) Date of Patent: Sep. 24, 2002

(54) METHOD AND APPARATUS FOR DISPLAYING COMPUTER GENERATED HOLOGRAMS

(75) Inventors: Tsutomu Horikoshi; Kazuhito Higuchi; Takaaki Akimoto; Satoshi Suzuki, all of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/966,527

(22) Filed: Sep. 28, 2001

Related U.S. Application Data

(62) Division of application No. 09/083,687, filed on May 21, 1998.

(30) Foreign Application Priority Data

| May 22, 1997 | (JP) | 9-131531 |
| May 22, 1997 | (JP) | 9-131532 |
| Jan. 20, 1998 | (JP) | 10-008161 |
| Mar. 2, 1998 | (JP) | 10-049093 |

(51) Int. Cl.$^7$ ............................................. G03H 1/08
(52) U.S. Cl. .............................. 359/9; 359/22; 359/23; 382/210
(58) Field of Search .................................. 359/9, 22, 23, 359/1; 382/210, 214; 348/40

(56) References Cited

U.S. PATENT DOCUMENTS 5,483,364 A * 1/1996 Ishimoto ........................ 359/9

* cited by examiner

*Primary Examiner*—Cassandra Spyrou
*Assistant Examiner*—Leo Boutsikaris
(74) *Attorney, Agent, or Firm*—Pennie & Edmonds LLP

(57) ABSTRACT

A method for displaying computer generated holograms of a display object is performed by computing fringe patterns produced by light interference from the display object. The steps are summarized as follows: three-dimensional data of the display object are converted into computational data for fringe pattern generation; a sampling rule for sampling computational data is selected; computational data are sampled according to a selected sampling rule; wavefronts generated by light illumination are computed by assuming that each sampled position has a light source; fringe patterns generated by computed wavefronts and a reference beam are computed; fringe patterns are stored as hologram images; sampling and a wavefront generation are repeated for all data; and a series of hologram images thus generated are displayed successively.

14 Claims, 30 Drawing Sheets

| No. | x | y | z | A | count |
|---|---|---|---|---|---|
| 1 | | | | | 1 |
| 2 | | | | | 0 |
| 3 | 7 | 2 | 10 | 1 | 0 |
| 4 | 10 | 12 | 11 | 1 | 1 |
| 5 | 11 | 13 | 15 | 1 | 0 |
| 6 | 9 | 10 | 12 | 1 | 0 |
| 7 | | | | | 1 |

FIG.15
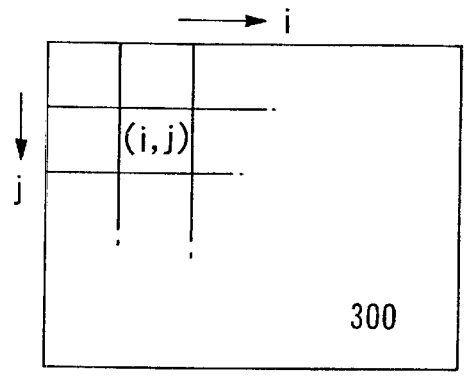
FIG.16A
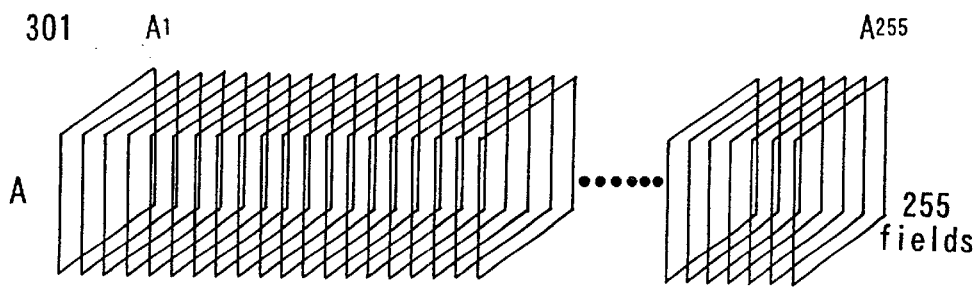
FIG.16B
FIG.16C
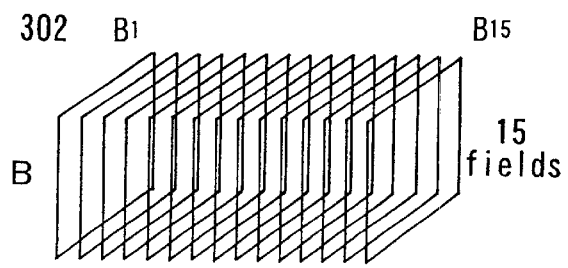
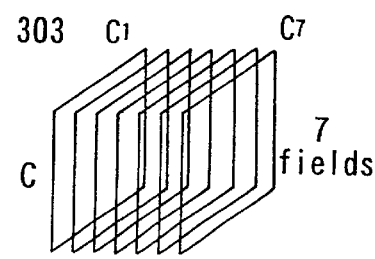

540:ORIGINAL IMAGE

541:FRINGE PATTERN

542:ERROR DIFFUSED
EXAMPLE 1

543:ERROR DIFFUSED
EXAMPLE 2

544:REPRODUCED IMAGE
(NO ERROR DIFFUSION PROCESSING)

545:REPRODUCED IMAGE
(WITH ERROR DIFFUSION PROCESSING)

FIG.31A      FIG.31B
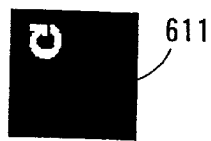
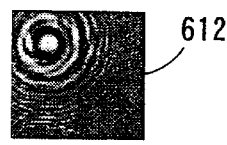
FIG.31C      FIG.31D
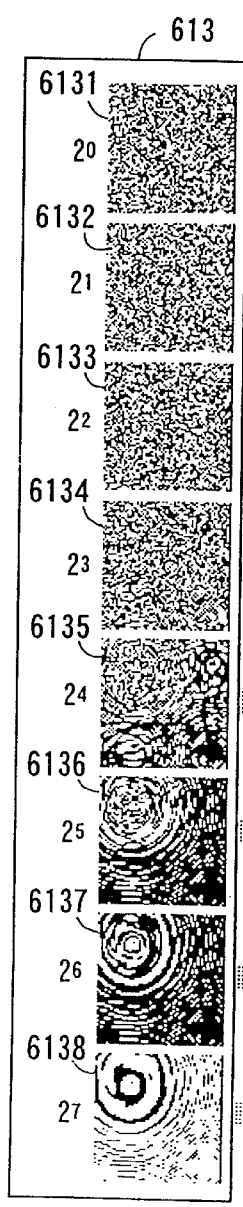
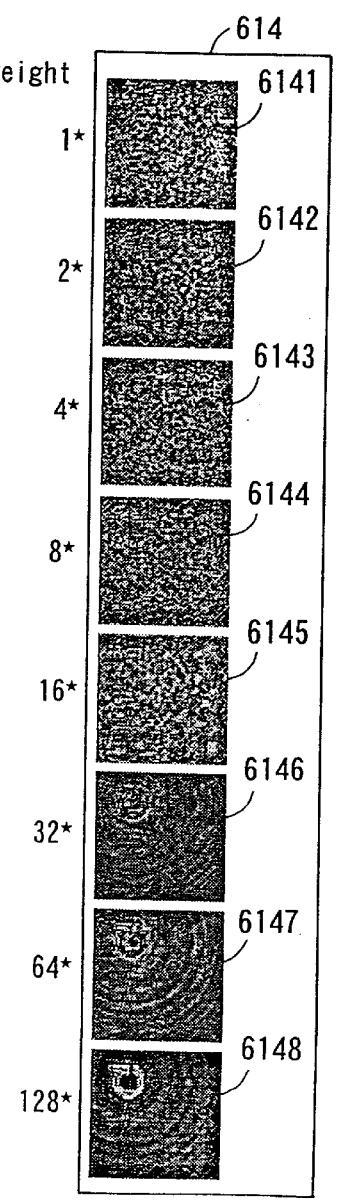
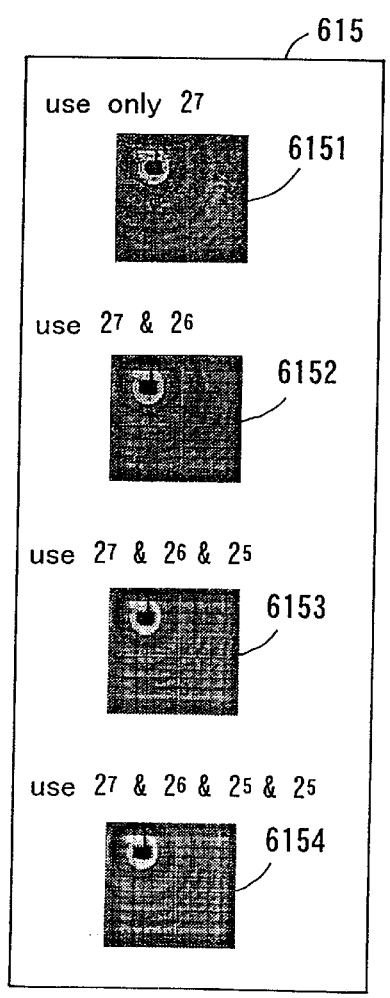
FIG.31E
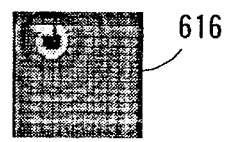

FIG.33A  FIG.33B  FIG.33C  FIG.33D
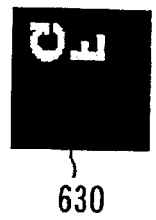   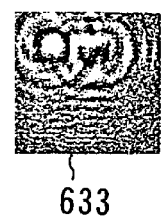
630      631      632      633
FIG.33E  FIG.33F  FIG.33G
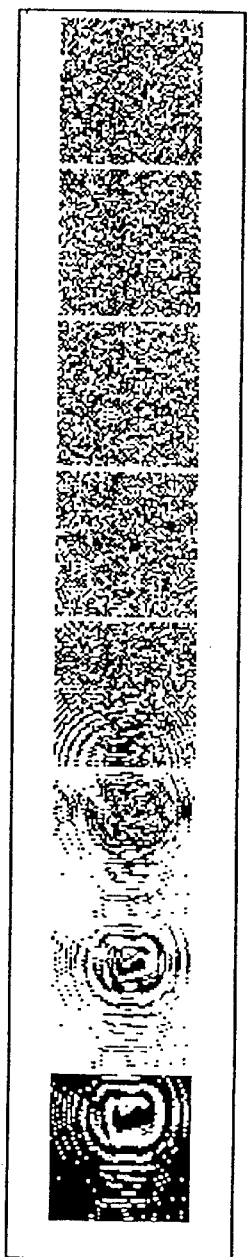 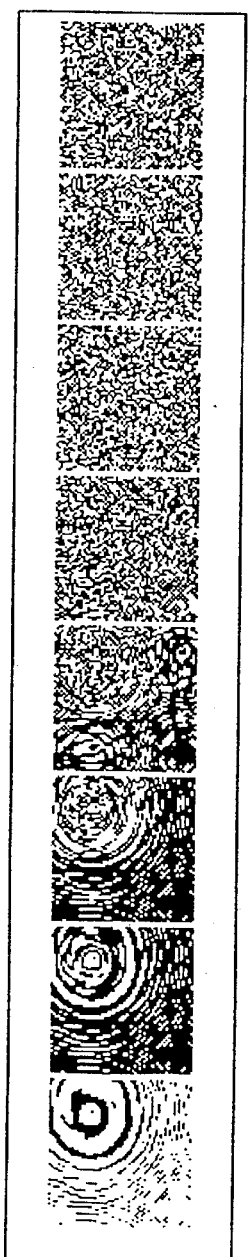 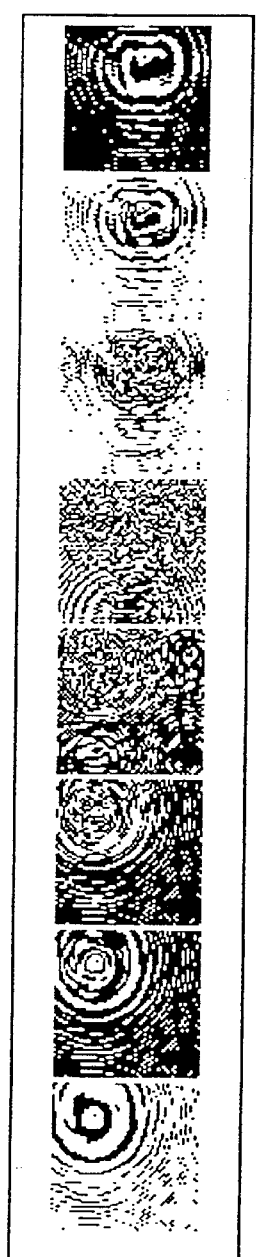
FIG.33H
637
634      635      636

METHOD AND APPARATUS FOR DISPLAYING COMPUTER GENERATED HOLOGRAMS

This is a division of application Ser. No. 09/083,687, filed May 21, 1998.

BACKGROUND OF THE INVENTION

1. Field of the Invention

The present invention relates to a technology for displaying computer generated holograms on such display medium as electronic display panel.

This application is based on Patent Application Nos. Hei 9-131531, Hei 9-131532, Hei 10-008161 and Hei 10-049093 filed in Japan, the contents of which are incorporated herein by reference.

2. Description of the Related Art

Conventionally, one method of producing computer generated holograms is to express an object as a collection of point-light sources, and obtain holographic fringe patterns of the wavefronts by computation and display the resulting holograms using acousto-optical modulator or liquid crystal display. Acousto-optical modulator suffers from a disadvantage that only one-dimensional fringes (horizontal parallax only) can be expressed, but liquid crystal panels has advantages such as its capability to display two-dimensional images and the ease of altering the image electrically. However, because it is normally necessary to electrically control the gray levels of each pixel in the liquid crystal panel, manufacturing of finer pixel spacing is limited by the difficulties in control circuit fabrication and other factors. To display a hologram, it is basically necessary to provide fine resolution of higher then 1,000 lines/mm, but such fine resolutions are difficult to achieve in practice so that holograms can presently display only fairly coarse images.

That the image resolution and its dynamic range are limited when using electronic display devices, such as liquid crystal display, means in effect that there is an upper limit of spatial frequencies that can be displayed on such devices and it can display only 256 gray level. In other words, to display one object, it is necessary to be able to display a certain amount of high frequency components, but because of the low resolution of the display devices, it is difficult to clearly display several items on the same screen. This is because the limiting high frequency components and dynamic range for display one object overlaps those of another items, thereby resulting in destruction of the fringe patterns of the high frequency components. Technically, it leads to a lack of sufficient data to reproduce the item, resulting in high value of signal to noise (S/N) ratio, and thereby restricting the number of items displayable in one view, i.e., limiting the expressive capability of displaying the details of object information.

SUMMARY OF THE INVENTION

It is an aim of the present invention to provide a technology for displaying computer generated hologram images to enable to display more detailed shapes of a display object or a larger number of display objects than is possible by the conventional hologram display technology, even when using an electronic display apparatus, such as liquid crystal display, which has a limited image resolution and dynamic range capability.

The aim has been achieved in a method for computing fringe patterns of a display object comprised by items and displaying computer generated holograms. In this methodology, three-dimensional data of the display object are converted into computational data for fringe pattern generation, and a sampling rule for sampling computational data is determined and computational data are sampled according to a selected sampling rule. Wavefronts are generated by assuming that each position of sampled three-dimensional data has a light source and generates a wavefront, and fringe patterns generated by interference of computed wavefronts and a reference beam are obtained and stored as hologram images. The steps of sampling and generating a wavefront are repeated for all computational data. The plurality of hologram images thus generated are displayed successively using the display apparatus provided in the present invention, which is used in conjunction with the procedures that are provided through suitable recording media exemplified.

The method thus achieves the object of displaying more detailed shapes of an item or a larger number of items by distributing the holograms, produced by the steps presented above, over a plurality of moving picture frames by a sampling technique appropriate to the nature of the display object.

The aim has been achieved in another method that can produce hologram video of a display object. In the moving picture production methodology, three-dimensional data of the display object are input into a computer device and input data are classified or grouped according to attributes of the display object, and a plurality of fringe patterns are computed for each classified or grouped display object. The plurality of fringe patterns are respectively converted into a plurality of digital images, and the plurality of digital images are decomposed into individual bits to form bit images. Bit images obtained for each classified or grouped display object are synthesizing to produce moving pictures for display. The plurality of hologram images thus generated are displayed successively using the display apparatus provided in the present invention, which is used in conjunction with the procedures that are provided through suitable recording media exemplified.

The method thus achieves the aim of displaying a larger number of items while decreasing the number of items displayed in one frame by distributing the digital images of the fringe patterns of a plurality of items, produced by the steps presented above, over a plurality of scenes in moving pictures, defined by frames and fields, by a digital processing technique appropriate to the nature of the display object.

BRIEF DESCRIPTION OF THE DRAWINGS

FIG. 15 is an illustration of a coordinate system.

FIGS. 16A~16C are examples of field image groups for each object.

FIGS. 31A~31E are illustrations of the digital display properties of the computer generated holograms.

FIG. 33A~33H are examples of the images produced in a method of the present invention.

DESCRIPTION OF THE PREFERRED EMBODIMENTS

The present invention of methods and apparatuses for computed hologram display are embodied in various embodiments which are presented in the following in such a way that, although each embodiment is discussed separately, a brief outline of the basic concept involved is presented before discussing the details of the respective embodiment.

The following is an overall outline for Embodiments 1~6.

Embodiments 1 and 2 are related to displaying an image by distributing the hologram images in a plurality of frames by a suitable sampling technique of the image data to be displayed so that the holographic images can be observed as a contiguous display of moving pictures. In other words, a frame division displaying technique is utilized to display more detailed shapes or a larger number of items.

Embodiments 3~6 are related to distributing the digital images of fringe patterns for a plurality of items over a plurality of frames/fields in a dynamic view so that the number of items per image layer is decreased but more items can displayed in a given number of views overall.

In the presentation which follows, a "frame" refers to one view for expressing moving pictures, and a "field" refers to image layers for comprising the frame.

Also, a display object may be comprised by one item or a plurality of items so that these terms are interchangeable in some cases.

The following is a summary outline for Embodiments 1 and 2.

Figure 1:
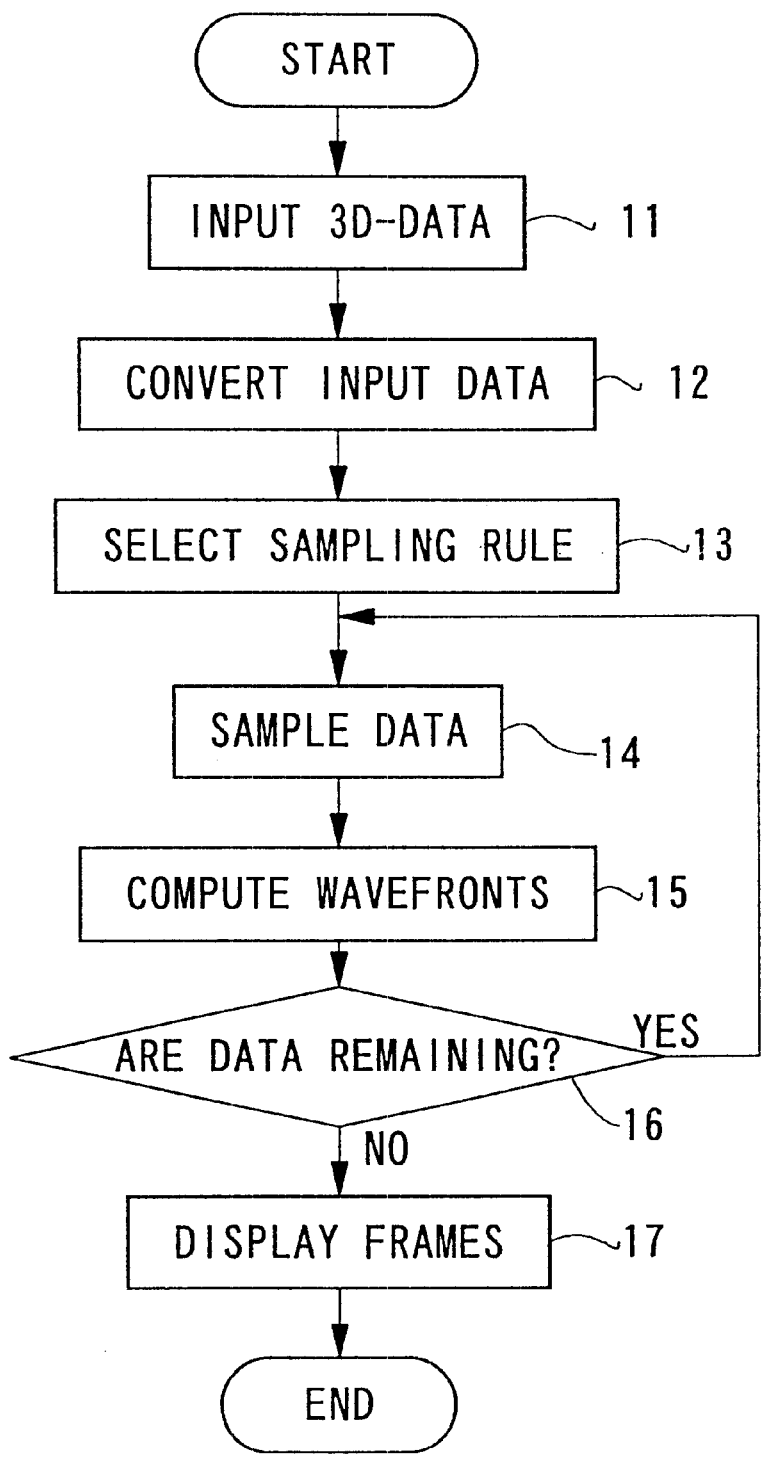
FIG. 1 is a flowchart for a hologram display method incorporating the special sampling methodology.

FIG. 1 is a flowchart of a method for displaying computer generated holograms common to both Embodiments 1 and 2.

First, three-dimensional data (3D-data hereinbelow) for an item to be displayed are entered into a computing device, and the 3D-data are converted to computational data for generating the fringe patterns (steps 11, 12).

Next, a sampling rule is specified for the converted 3D-data (step 13).

Next, converted 3D-data (computational data) are sampled according to the sampling rule selected, and wavefront data are computed by assuming that each of the 3D-data sampled has a light source for emitting waves, and the computed interference patterns between the wavefronts and the reference beam are stored as hologram images (steps 14, 15).

Sampling and wavefront generation steps are repeated, and the movie-like hologram images thus produced are successively displayed (steps 16, 17).

The items are thus distributed over a plurality of moving pictures by a suitable sampling technique so that the hologram images can be displayed as contiguous frames, thereby enabling to observe more detailed shapes or a larger number of items than is possible by the conventional computed hologram display techniques.

Figure 2:
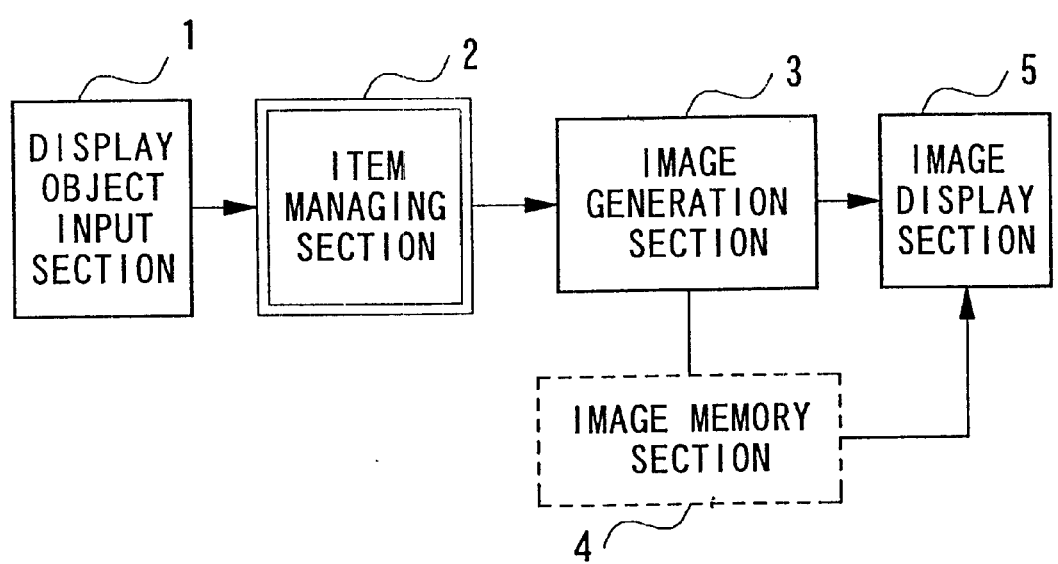
FIG. 2 is a block diagram of an apparatus for carrying out the method shown in FIG. 1.

FIG. 2 is a block diagram of an apparatus for executing the method shown in FIG. 1. FIG. 2 shows that the display apparatus is comprised by: display object data input section 1; item management section 2; image generation section 3; and an image display section 5. Here, the display object data input section 1 executes step 11 in FIG. 1, and the item management device 2 executes steps 11 to 14 inclusively and step 16. The image generation section 3 executes step 15 in FIG. 1, and image display section 5 executes step 17 in FIG. 1.

An image memory section 4 provided in FIG. 2 is for storing holographic image data computed by the image generation section 3, and it is used when displaying the stored images on the image display section 5 or transmitting the images for display. The image memory section 4 may also be used as a temporary storage during an image generation step.

The sections shown in FIG. 2 may include hardware-driven devices or software-driven devices to be executed by memory devices working in conjunction with a central processor unit (CPU) which are not shown in these drawings.

The method and apparatus of Embodiment 1 illustrated in FIGS. 1 and 2 will be explained in more item in the following.

Embodiment 1

In the first embodiment, 3D-data of the display object are separated into several sections or items, and each item is sampled and the computed fringe patterns are displayed on a plurality of frames, thereby enabling to display more detailed shapes or a larger number of the items.

Specific details will be presented in the following.

Electronic display devices are limited in their image resolution and dynamic range capability, in other words, even if attempts are made to present fringe patterns generated by a plurality of light sources simultaneously, only a limited number of these fringe patterns can be displayed. Basically, it means that only "n" pieces of light sources can be displayed at the same time. As an example, a value of one hundred will be assumed for n, meaning that the display apparatus is capable of displaying one hundred point light sources at the same time, and the method will be illustrated using the flowchart shown in FIG. 3.

First, 3D-data of the display item are entered into a computing device (step 121). In this examples, a display object is comprised of items 101, 102 illustrated in FIG. 4. It is assumed that each of the display items 101, 102 consist of a collection of 3D-coordinate data and are to be displayed on a display screen 103.

Figure 4:
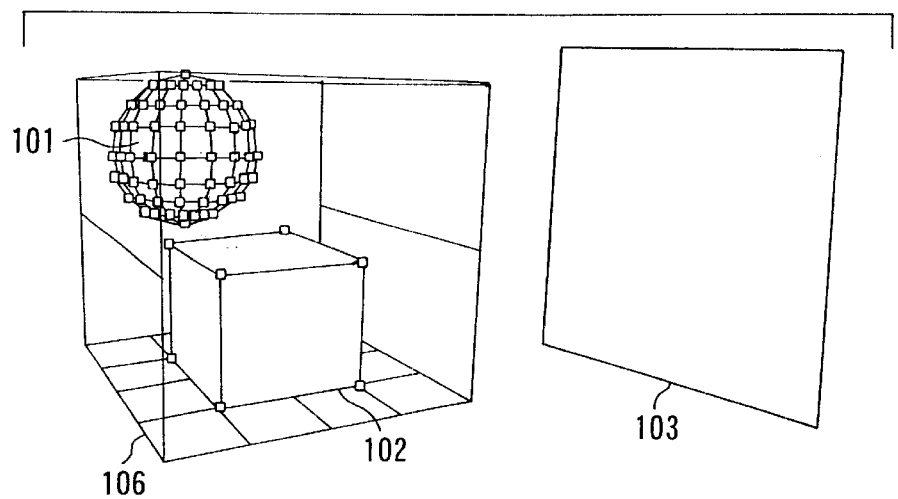
FIG. 4 is an example of three-dimensional input data.
Figure 5:
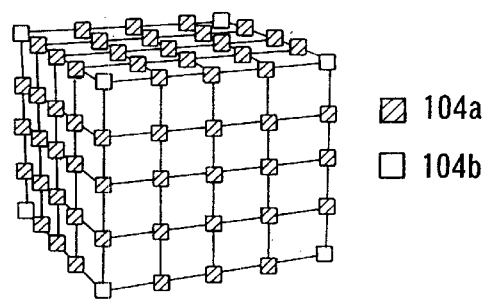
FIG. 5 is an illustration of a conversion of three-dimensional data.

Here, when the 3D-data of the display object are polygonal data described by vertices and edges, the surface information can be expressed by subdividing the surfaces comprising the polygon into a mesh of finer descriptions. For example, the individual surfaces in the polygonal data comprising item 102 in FIG. 4 are subdivided into 16 sectors as shown in FIG. 5, and the vertex coordinates in each subdivided surface are used as a new 3D-datum. In FIG. 5, the points 104a are original 3D vertex data, and the points 104b are additional new points created by the subdivision. In this step, if the density of the vertex coordinates is already at a required value, there would be no need to subdivide into a finer mesh.

Next, a list for 3D-coordinates (vertex coordinates) comprising the item is prepared (step 122). In this case, a list is prepared for each item 101 and 102 to contain the vertex coordinates of the surfaces created by the sub-dividing process is prepared for.

Next, the sampling rule is selected for selecting input data from the list prepared in step 122 (step 123). For example, based on the limit of resolution of the display device, and assuming the number of item-data that can be displayed simultaneously is one hundred, random sampling will be selected. Sampling rule will be explained in more detail in later embodiments.

Next, the specified number (100 pieces) of vertex coordinate data are selected from the list prepared in step 122 (step 124). In this case, a total of 100 pieces of vertex coordinate data are selected from the lists prepared for items 101, 102. As an example, from the vertex coordinate data for item 101, vertex coordinate data 105a shown in FIG. 6 will be selected for frame (n) while the vertex coordinate data 105b will be selected for frame (n+1).

Next, assuming that each of the vertex coordinate data selected in step 124 is a point light source, interference fringes formed by the reference beam on the display screen 103 are computed (step 125). The obtained fringe patterns are stored temporarily in memory as hologram images.

Next, if there are vertex coordinates data still remaining, steps 124 to 125 are repeated (step 126).

Figure 6:
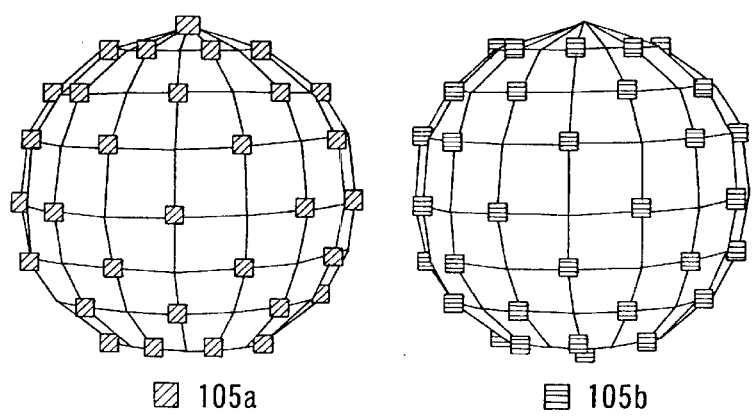
FIG. 6 is an illustration of sampling data.

In step 124, vertex coordinate data 105a shown in FIG. 6 are selected from the vertex coordinate data for item 101 to be displayed in frame n. In step 125, interference fringes formed by the wavefronts and the reference beam on the display screen 103 are computed, and the results are stored temporarily in memory. Next, because there are still remaining vertex coordinate data, the vertex coordinate data 105b remaining in step 124 are selected, and similar processing is carried out (steps 124~126).

Lastly, hologram images stored temporarily in memory are successively displayed (step 127).

The above steps complete the display process of computer generated holograms.

Accordingly, holograms of the display item are distributed in different frames by sampling and these frames are displayed as image sequences. In other words, frame division display technique evokes after image effect in human vision, so that more detailed shapes or a larger number of items can be displayed even on a low resolution display device. More specifically, using a two-dimensional square-shaped object illustrated in FIG. 10 as an example, the ultimate image of the square object, comprised by fringe patterns from the individual frames n, n+1, n+2, n+3, is described by a series of coarse images contained in layers such as 231, 232, which are comprised by points generated by wide sampling intervals. If the frames are displayed continually at a high speed, human vision perceives them as a single item, (i.e., an item sampled at a finer sampling interval) as illustrated by a layer 233, of the square shape comprised by densely packed points. Therefore, even on a low resolution display device, more detailed shapes and higher number of items can be displayed.

The flowchart shown in FIGS. 1 correspond with that shown in FIG. 3 as follows: steps 121~127 in FIG. 3 correspond to steps 11~17 in FIG. 1.

In the above example, steps 121 to 126 are carried out first and step 127 is repeated to produce a moving picture, but it is also possible to provide real-time viewing based on steps 121 to 127, without resorting to the intermediate storage step. In this case, before carrying out step 127, the holograms are successively transmitted to a destination, and the images are displayed on the destination display device. By adopting such an approach, it becomes possible to provide progressive transmission by which the item becomes clear gradually as the number of images transmitted increase. Because the number of display items in each layer is relatively low, fringe spacings are relatively coarse. In other words, compared to the conventional fringe patterns, the spatial frequency is lower in the present technique so that it is possible to increase the efficiency for data compression.

Also, in the above example, vertex coordinate data of the item are assumed to originate from point light sources to produce a hologram based on a collection of point light sources, but the type of light source is not specified in the present embodiment. For example, it is possible to assume that individual surfaces (patches) comprising the 3D-polygon data are separate planar light sources.

It is also possible to replace individual 3D-data of the display item with individual voxels 106, illustrated in FIG. 4, to represent the display space so that the input data now become volume data to be sampled in each voxel. The concept of voxel will be explained in detail in Embodiment 2.

The presentation so far has been based on some given sampling rule for 3D-data, but in step 122, input data may be converted item by item so that sampling rule can be altered to suit the attributes of the item. Specifically, the following steps may be taken.

1) Sampling Based on the Distance Between the Item and the Screen

When a scene is comprised by items distributed over a distance, those items which are further away from the screen can be sampled at lower intervals while the items closer to the screen are sampled at finer intervals. The spatial frequencies of fringe patterns for far items are lower than those of close items such that, even if the sampling density is raised, the probability of mutual destruction of fringes is small.

2) Sampling Based on Properties of Item

Sampling density for moving items is made lower than that for static items. Moving items do not present problems of image quality compared to static items even at lower sampling densities. Sampling rule may be chosen so that the faster the speed of the moving items the lower the sampling density.

As explained above, by synthesizing wavefronts of differing spatial frequencies by a sampling rule according to the properties of the item, mutual destruction of interference fringes is reduced. Therefore, even a low resolution display device can have many items displayed simultaneously. It is possible to combine the sampling rules 1) and 2) discussed above.

Although the examples above were based on an approach of altering the sampling rules to suit the properties of the item, the same effects can be produced by devising a suitable approach in creating the list for vertex coordinate data in step 122. Specifically, the following approaches are possible.

1) List Creating Rule Based on Distance Between Item and Display Screen

Vertex coordinates list is created so that the items which are far from the display screen will be sampled at a low density of vertex coordinate data while the items which are near to the display screen will be sampled at a high density of vertex coordinate data.

2) List Creating Rule Based on Properties of Item

For moving objects, the density of vertex coordinate data is made low, and for static objects, the density of vertex coordinate data is made high. The higher the speed of the moving object, the lower may be the data density of vertex coordinates.

Once a sampling rule is chosen in step 123, the same rule is applied to all the items. Also, the rules 1) or 2) above may be combined in a suitable way.

Figure 3:
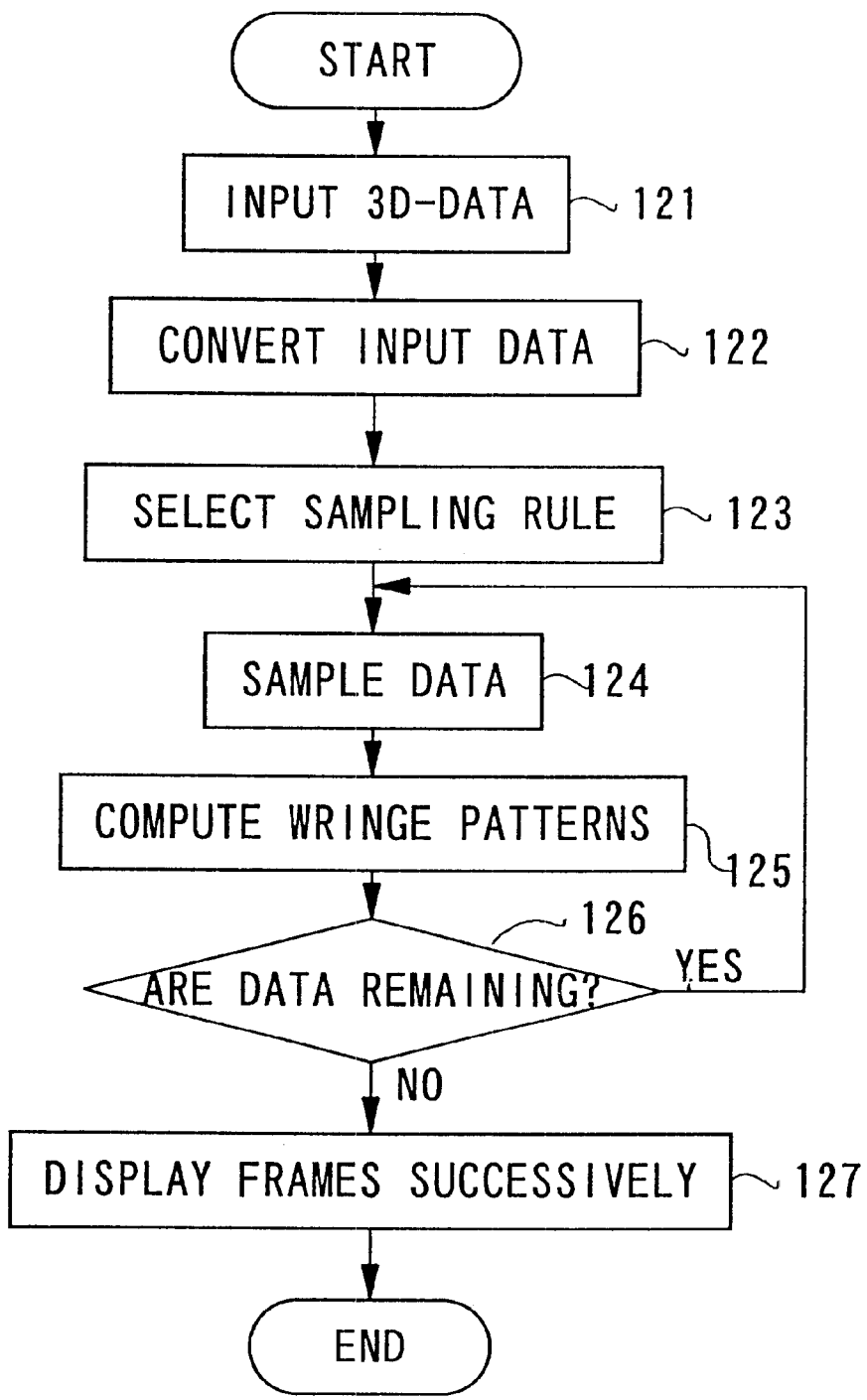
FIG. 3 is a flowchart of a first embodiment of the method of displaying holograms.
Figure 7:
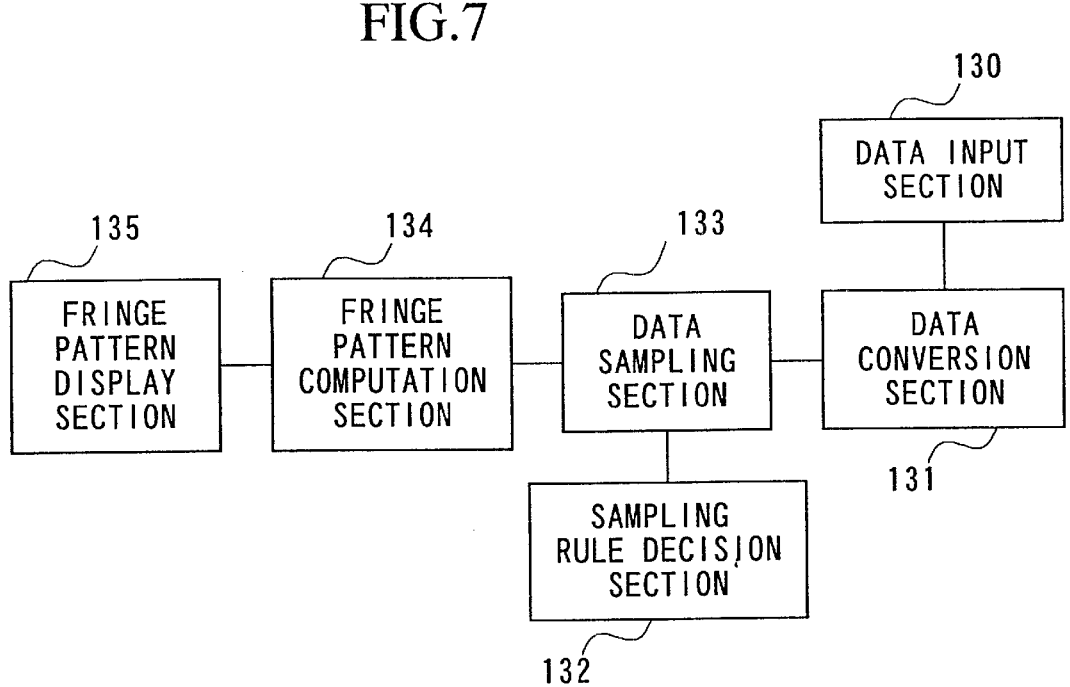
FIG. 7 is a block diagram of an apparatus in the first embodiment.

Next, an example of the configuration of the display apparatus to be used with the method according to the flowchart in FIG. 3 is shown in FIG. 7. The display apparatus comprises: a data input section 130; a data conversion section 131; a data sampling section 133; a sampling rule decision section 132; a fringe pattern computation section 134; and a fringe pattern display section 135. The operation of the apparatus will be presented in the following.

The 3D-data of the display object entered by the data input section 130 are converted into a data structure to suit the computational needs, such as dense or sparse 3D-data. In the sampling rule decision section 132, sampling rule is decided based on the type of input data, and the data sampling section 133 samples the input data. The fringe pattern computation section 134 computes the fringe patterns, using the sampled 3D-data, to be displayed as holograms. The computed hologram images are displayed successively on the fringe pattern display section 135. That is, the data input section 130 executes step 121 shown in FIG. 3, and the data conversion section 131 executes step 122. The sampling rule decision section 132 executes step 123, and data sampling section 133 executes steps 124, 126. The fringe pattern computation section 134 executes step 125, and the fringe pattern display section 135 executes step 127.

Various sections shown in FIG. 7 correspond to those in FIG. 2 as follows: data input section 130 in FIG. 7 to display object input section 1 in FIG. 2; data conversion section 131, sampling rule decision section 132 and data sampling section 133 to item managing section 2; fringe pattern computation section 134 to image generation section 3, and fringe pattern display section 135 to image display section 5.

Accordingly, an item to be displayed is observed in a hologram through image sequences that are contiguous frames which are produced by distributing the item according to a selected image sampling rule to a plurality of different frames. This is, a frame division technique is used, in effect, to display more detailed shapes of an item or a larger number of items in one holographic image. Because the number of items contained in one layer is lowered, interference fringes for each item are decreased, thereby decreasing the S/N ratio to avoid burying the image in the background noise, and increasing the number of items which can be clearly displayed in one hologram.

When a sampling rule based on item properties is chosen, wavefronts of differing spatial frequencies would be synthesized so that mutual destruction of fringe patterns can be lessened. Therefore, the number of items which can be simultaneously displayed can be increased even on a low resolution display device.

In changing the conversion step 122 in FIG. 3 to conversion to voxel data, if a sampling rule for scanning is according to the Hilbert curve, for example, the display resolution for the display object can be described in hierarchically, and it becomes possible to perform a progressive display of images.

Further, if the holographic images are to be transmitted, the number of objects to be displayed in one screen can be decreased so that the holograms themselves can be represented with a fewer number of spatial frequencies, resulting that the efficiency of data compression can be increased. This would be useful when transmission capacity is limited. Because successive transmissions of image data are presented in layers of differing data densities, the hologram image quality becomes dependent on the capacity of the transmission means. In other words, images are never made totally invisible but the image resolution would be poor in a low capacity transmission environment but would be high in a high capacity transmission environment because there would be less loss of detailed data.

Embodiment 2

In Embodiment 1, the approach was to prepare a list of data vertex coordinates for each object, and vertex sampling was executed according to the list. In Embodiment 2, the display space containing the display object is separated into a series of cubes or "voxels" so that each voxel is sampled by the apparatus.

The embodiment will be presented with reference to the drawings.

Figure 8:
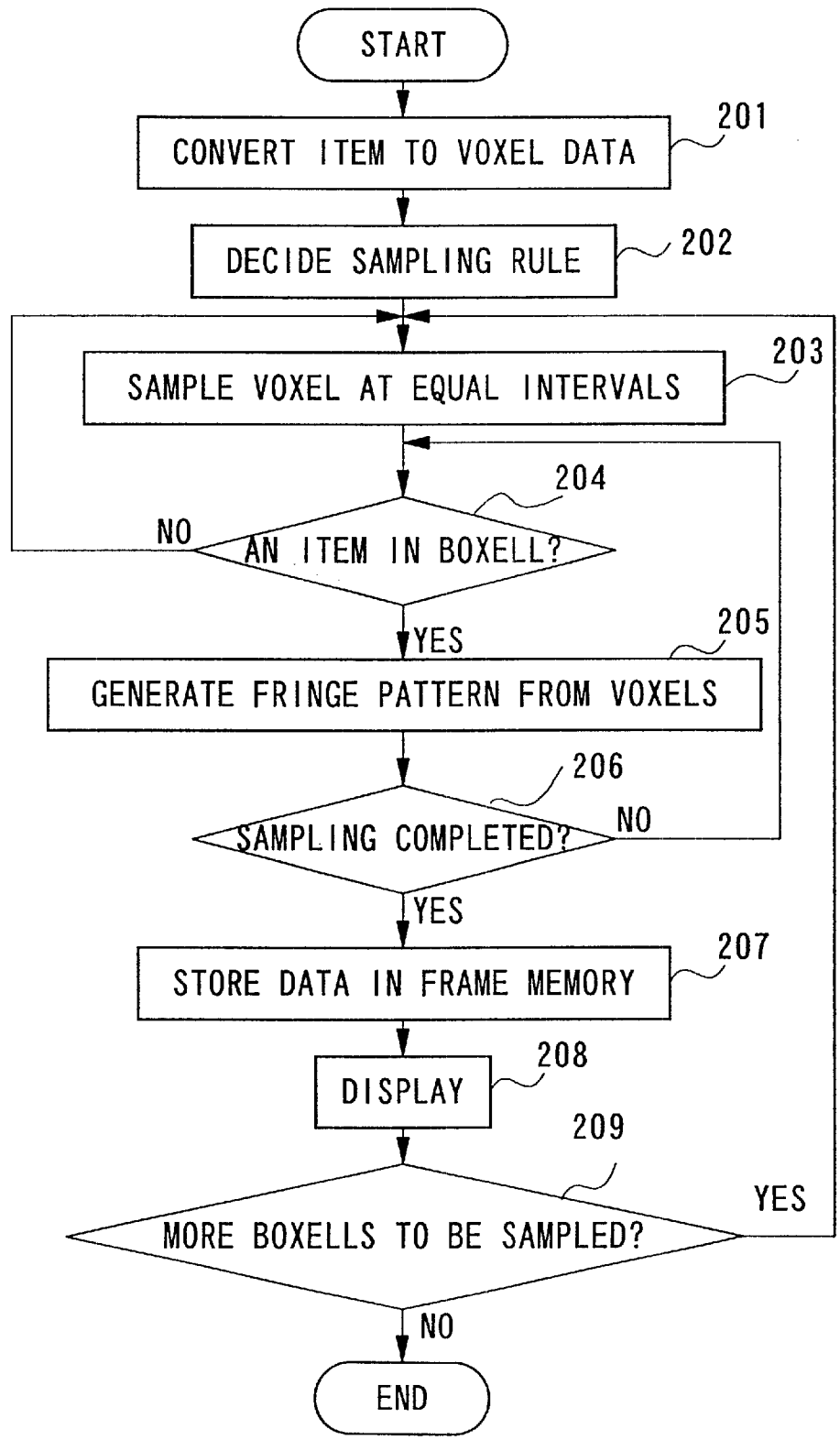
FIG. 8 is a flowchart of a second embodiment of the method of displaying holograms.

First, the method of Embodiment 2 will be explained. FIG. 8 is a flowchart for an example of the method.

Figures 9A, 9B:
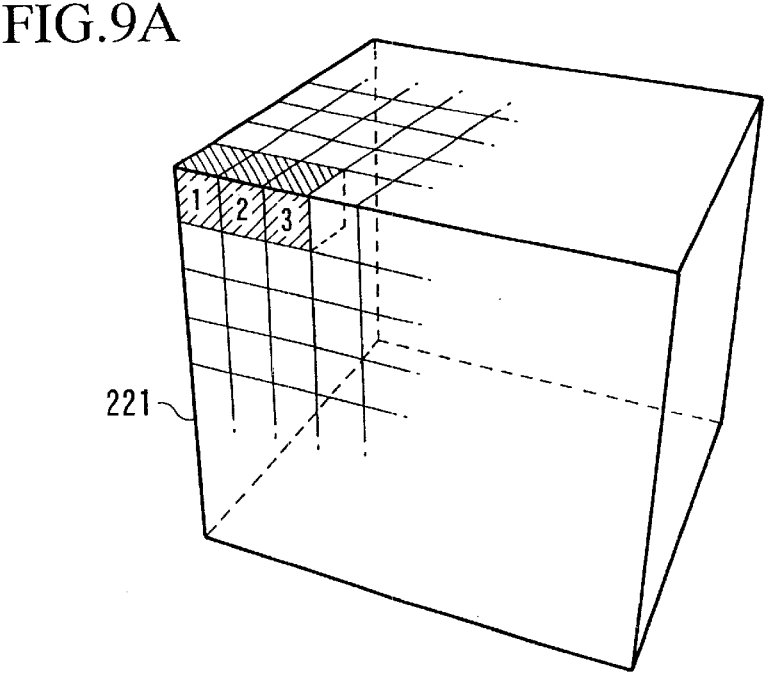
FIGS. 9A, 9B are examples of voxel data to be used in the above embodiment.

First, a display object, for example polygonal data or volume data (scanned data such as CT images) is converted into voxel data 221 such as those shown in FIG. 9A (step 201). Each voxel is identified by a voxel number (No.) and a voxel containing an display object has registered coordinates (x, y, z) and intensity (A). In the case of a table 222 given in FIG. 9B, it can be seen that voxel Nos. 3, 4, 5 and 6 contain an object.

The voxel data 221 are sampled under a given sampling rule (for example, equal distances, such as every 3 boxcells) in steps 202, 203. Those voxels which have been sampled are identified by a sampled flag (for example, by entering 1 at the end of the count column) as indicated in table 222. If a voxel contains a display object (step 204), the intensity of the object is determined and a corresponding point light source is assigned. Wavefront from this point light source on the holographic plane is computed (step 205) and the results are stored in memory (step 207). In table 222 in FIG. 9B, voxel No. 4 is the object of processing.

Sampling is continued so that all the wavefronts from each point light source are computed (step 206) and all the wavefronts are synthesized, and computed results processed with the wavefronts of the reference beam are written into the frame memory (step 207). The data written into the frame memories are displayed as holograms (fringe patterns) in step 208. Next, remaining voxels are repeatedly subjected to the same process (steps 203 to 209) in step 209. With reference to table 222 in FIG. 9B, voxels Nos. 2 and 5 become the targets for sampling in the second round, and since an item exists in voxel No. 5, only voxel No. 5 becomes the target for wavefront computation. Here, the sequence of steps 209, 208 may be reversed. This is made possible by providing a plurality of frame memories so that a plurality of wavefront results for display items can be computed so that, when they are to be displayed, it is necessary to execute only data recall step from the frame memories. This approach enables faster displaying of many frames.

The steps in FIG. 1 correspond to those in FIG. 8 as follows: step 201 in FIG. 8 corresponds to step 12 in FIG. 1; step 202 to step 13; step 203 to step 14; steps 204, 206, 209 to step 16; step 205 to step 15; and steps 207, 208 to step 17. In FIG. 8, a step to correspond to step 11 in FIG. 1 is omitted.

Figure 10:
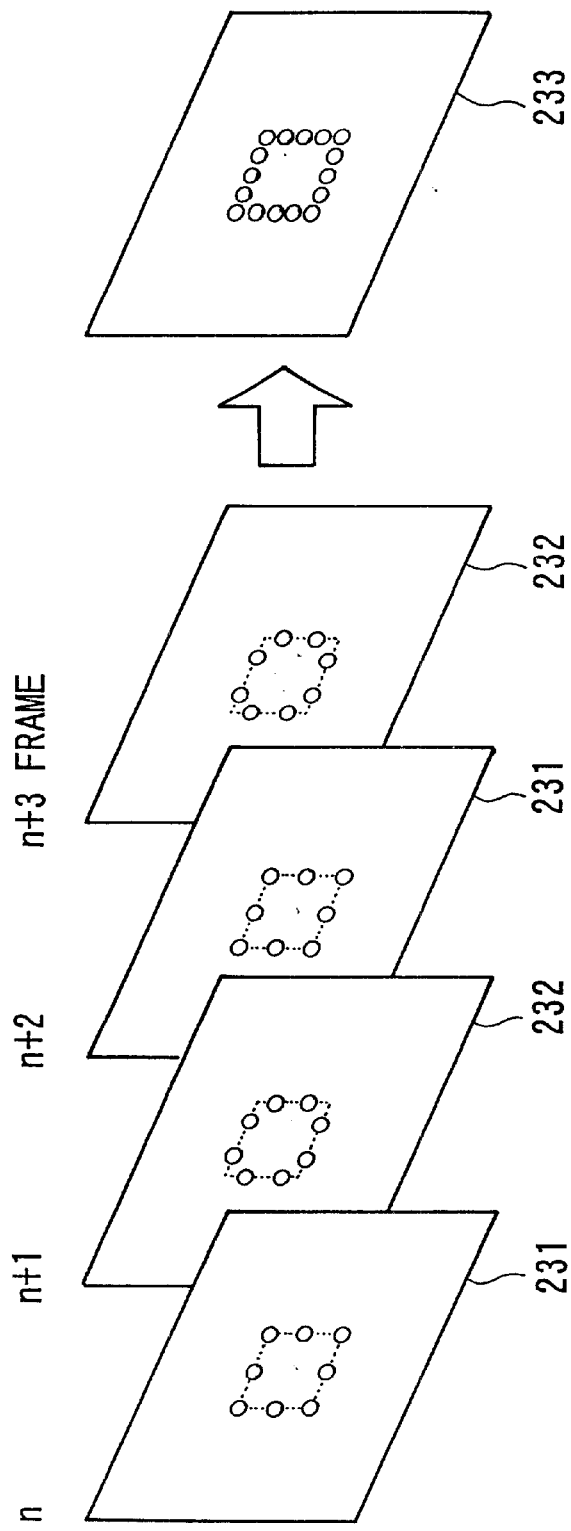
FIG. 10 is a drawing to illustrate the concept of the present invention.

By repeating the scanning process presented above, using a two-dimensional square-shaped item illustrated in FIG. 10 as an example, the ultimate image of the square item, comprised by fringe patterns from the individual frames n, n+1, n+2, n+3, is represented by a series of coarse images contained in layers such as 231, 232, which are comprised by points generated by widely separated sampling. If the frames are displayed continually at a high speed, human eyes perceive them as a single item, (like an item sampled at a finer sampling rate) as illustrated by a file 233, of a square shape comprised by densely packed points.

Figure 11:
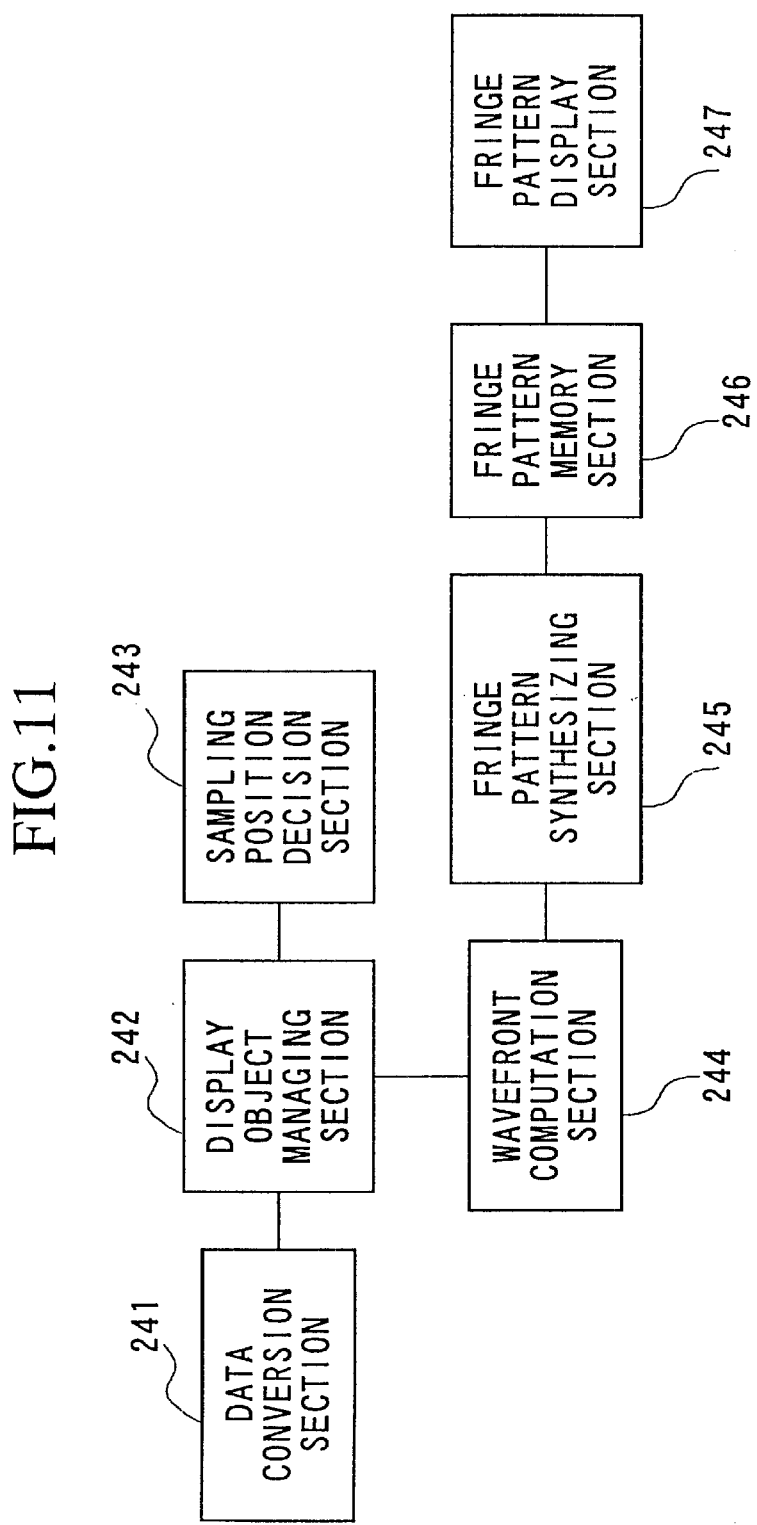
FIG. 11 is a block diagram of an apparatus in the second embodiment.

Next, the configuration and operation of the apparatus having the component sections presented above will be explained. FIG. 11 is a block diagram of the apparatus for displaying holograms.

The apparatus is comprised by: a data conversion section 241; a display item managing section 242; a sampling position decision section 243; a wavefront computation section 244; a fringe pattern synthesizing section 245; a fringe pattern memory section 246; and a wavefront display section 247.

The display object input into the data conversion section 241 is converted into voxel data and is stored in the display object managing section 242. In the sampling position decision section 243, sampling rule has been pre-selected, and instructs the wavefront computation section 244 on voxel positions to be sampled. In the wavefront computation section 244, if the sampled voxel has an object registered, a point light source is assigned to the voxel to compute the wavefront on the hologram plane. The computed wavefront data are registered in the memory in the wavefront synthesizing section 245. All the relevant voxels are subjected to the above processing, and wavefront data are successively added to the memory. When the processing is completed, wavefront synthesizing section 245 registers memory data into the frame memory of the fringe pattern memory section 246. The above processing steps are successively performed and the results are registered in the fringe pattern memory section 246 accordingly. The registered fringe patterns are successively called out to the wavefront display section 247 to be displayed.

The structures in FIG. 11 correspond to those in FIG. 2 as follows. The data conversion section 241, the display item managing section 242 and the sampling position decision section 243 in FIG. 11 correspond to the item managing section 2 in FIG. 2; the wavefront computation section 244, the fringe pattern synthesizing section 245 to image generation section 3; the fringe pattern memory section 246 to image memory section 4; and the wavefront display section 247 to image display section 5. A section to correspond to the display object input section in FIG. 2 is omitted in FIG. 11.

The control methodology outlined above enables to display more clear images than conventional images, even on a low resolution display device, because of the low number of items shown in each layer constituting a frame of the item to be displayed.

It should be noted that, although the item is assumed to be a point light source in the above embodiment, it is possible to assume that a planar light source having a surface inclination angle as a parameter exists inside a voxel, therefore, it is not necessary to limit the type of light source to this embodiment.

Also, in the present embodiment, equidistant sampling was used as the sampling method, but other sampling methods may be used. For example, it is possible to display progressive images, if a sampling rule based on the Hilbert curve scanning of the item is chosen, so that the display resolution for the display object can be sampled in gradually changing layers from coarse image resolution (low data density) to progressively finer resolution (high data density). By sampling the space in such layers, it becomes possible to display images progressively. Also, when there are many objects in a voxel, sampling by layers or sampling of low density images may be perfumed in many ways. Selection may be based on objects of maximum intensity or on an average computed intensity for all items so that there is no need to specify any one particular approach. As in previous embodiments, the sampled fringe patterns may be transmitted successively to a destination, and the destination image display can be used to refresh the images to enable progressive image transmission/display.

Sampling method may be based on a combination of voxels which are at a far distance from the display screen with those which are close to the screen. Spatial frequencies obtained from far items are lower than those from close items so that mutual destruction of fringe patterns displayed on one screen can be reduced.

Furthermore, other sampling methods may include a method based on lowering the sampling density for those voxels close to the display screen and raising the sampling density for those far from the screen. Spatial frequencies for far objects are lower than those for close objects so that the probability of fringe pattern destruction is less for the far objects even if the sampling density is raised.

Also, regarding the space to be specified initially, it may not be the whole input data but it may be a partial space to include only the display object, or it may be a volume data assumed for each display object to be individually processed. In other words, for each display object, a volume datum may be defined locally, thereby enabling to define an optimum degree of resolution for static as well as moving objects.

As described above, the present method of holography is able to display more detailed shapes or more objects compared to the conventional technologies of hologram display by enabling to view several frames while decreasing the number of display object contained in each frame.

Further, the space division approach enables fringe patterns to be computed according to a uniform amount of computational effort, regardless of the complexity of the display object.

Further, selection of sampling rule enables to achieve the optimum degree of resolution necessary to display an item for each frame, thereby enabling to decrease the volume of data necessary for holographic information transmission or to execute progressive transmission to suit the changes in the transmission capacity.

Summarizing the above embodiment, the embodied method of displaying computed holograms is comprised of the steps of: preparing display data for a display object as voxel data; specifying a sampling rule for a voxel; sampling an object space according to a selected sampling rule; determining whether an object exist in a voxel being sampled, and assuming that a voxel containing an object is a light source; computing a wavefront emitted by an object-containing voxel to obtain a fringe pattern as a hologram image; repeating the steps of sampling a voxel and computing a wavefront; and successively displaying a series of hologram images thus produced on a display screen.

The holographic display apparatus embodied above for displaying computed holograms is comprised by: a data conversion section for converting an object into voxel data; a display object managing section for managing voxel data so converted; a sampling rule decision section for specifying a sampling rule for sampling the voxel data; a wavefront computation section for computing a wavefront generated by an object-containing voxel by assuming the object-containing voxel to be a light source; a fringe pattern synthesizing section for combining a plurality of computed wavefronts for each sampled data to generate a fringe pattern; a fringe pattern memory section for storing synthesized fringe patterns; and a wavefront display section for displaying a holographic image comprised by fringe patterns.

The apparatus described above may be further provided with a data transmission section for successively transmitting stored fringe patterns and replace the display section with a serial display section for serially displaying successively transmitted fringe patterns.

Accordingly, an object to be displayed is observed in a hologram through movie-like contiguous frames which are produced by distributing the object according to a selected image sampling rule to a plurality of different frames. This is, a frame division technique is used, in effect, to display more detailed shapes or a larger number of items in one holographic image. Because the number of data contained in one layer is lessened, interference fringes for each item are decreased, thereby lowering the S/N ratio to avoid burying the image in the background noise, and increasing the number of objects which can be clearly displayed in one hologram.

In the step of sampling rule selection for voxel data, by choosing a sampling rule based on the Hilbert curve for scanning, it is possible to display progressive images of the object so that the display resolution for the display object can be described in gradually changing layers.

Furthermore, if the holographic images are to be transmitted, because the number of objects to be displayed in one layer is decreased, the present method and apparatus are able to accommodate some limits in transmission capacities. By successively sending holographic image data presented on layers of differing data densities, even when the transmission capacity changes, progressive images are never made totally invisible in the present invention, but the image resolution would become poor in a low capacity transmission environment but would become high in a high capacity transmission environment.

Embodiments 3 to 6

The Embodiments 3 to 6 presented in the following relate to methods and apparatuses for distributing digital images of fringe patterns for a plurality of objects over a plurality of layers of moving pictures in image layers such as frames/fields so that, although each layer contains a fewer number of objects, a frame as a whole, consisting of some given number of field layers, is able to show a larger number of objects.

Figure 12:
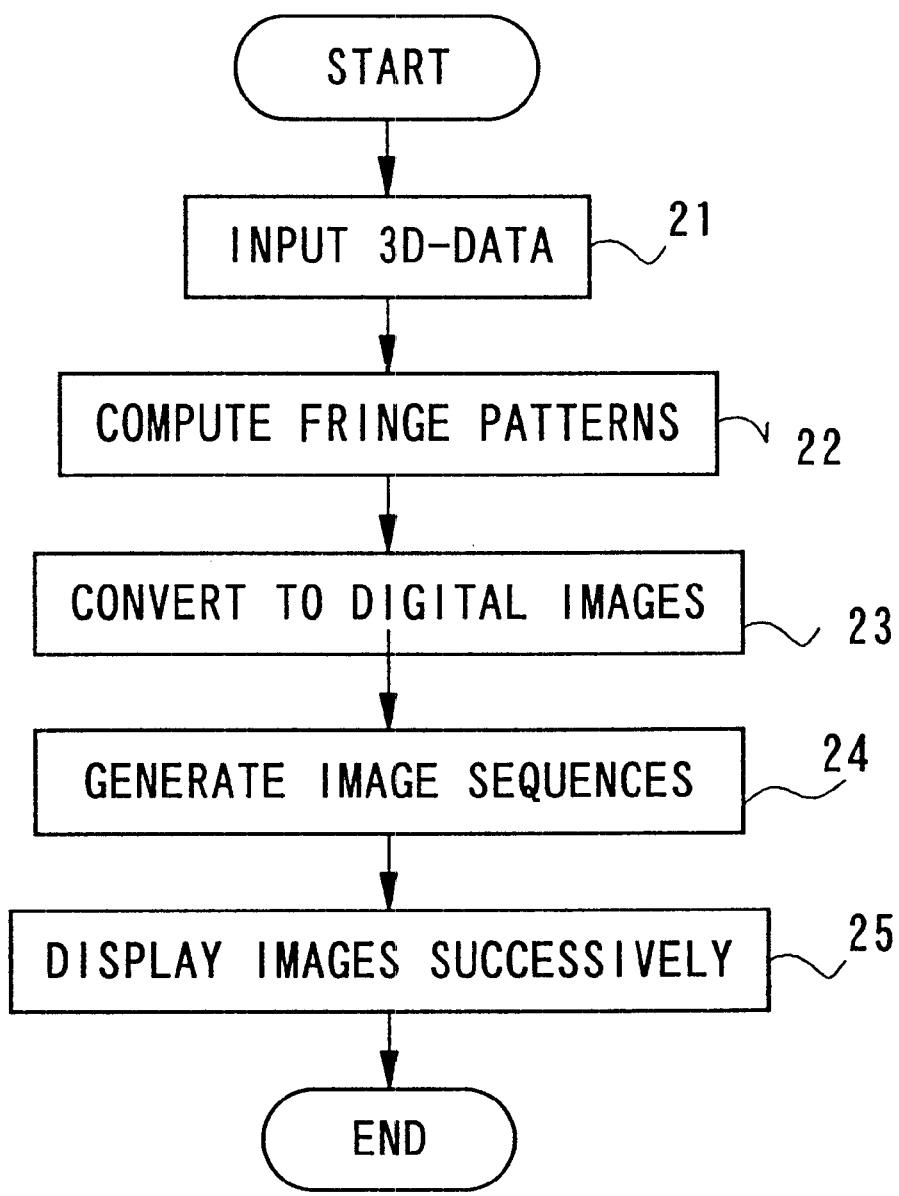
FIG. 12 is a flowchart for a method of displaying holograms with the special technique for generating moving images.

Before explaining the details of the Embodiments 3 to 6, common features of the display method for computed holograms will be presented with reference to FIG. 12.

First, 3D-data of the display object are input into the apparatus (step 21).

Then, the input data of the display objects are classified/grouped, as necessary, and interference fringes formed by the reference beam are computed for each classified or grouped display object (step 22).

Next, the computed fringe patterns are converted into digital images, by separating into individual bits (step 23).

Next, image sequences for display are generated by combining bit images for each classified/grouped display object (step 24), and the generated moving pictures are displayed under a controlled timing (step 25).

Accordingly, by distributing the digital images of a plurality of fringe patterns for a plurality of items, over a plurality of layers of bit images, a larger number of items can be displayed over a frame consisting of a number of layers, although each layer contains a fewer number of items.

Figure 13:
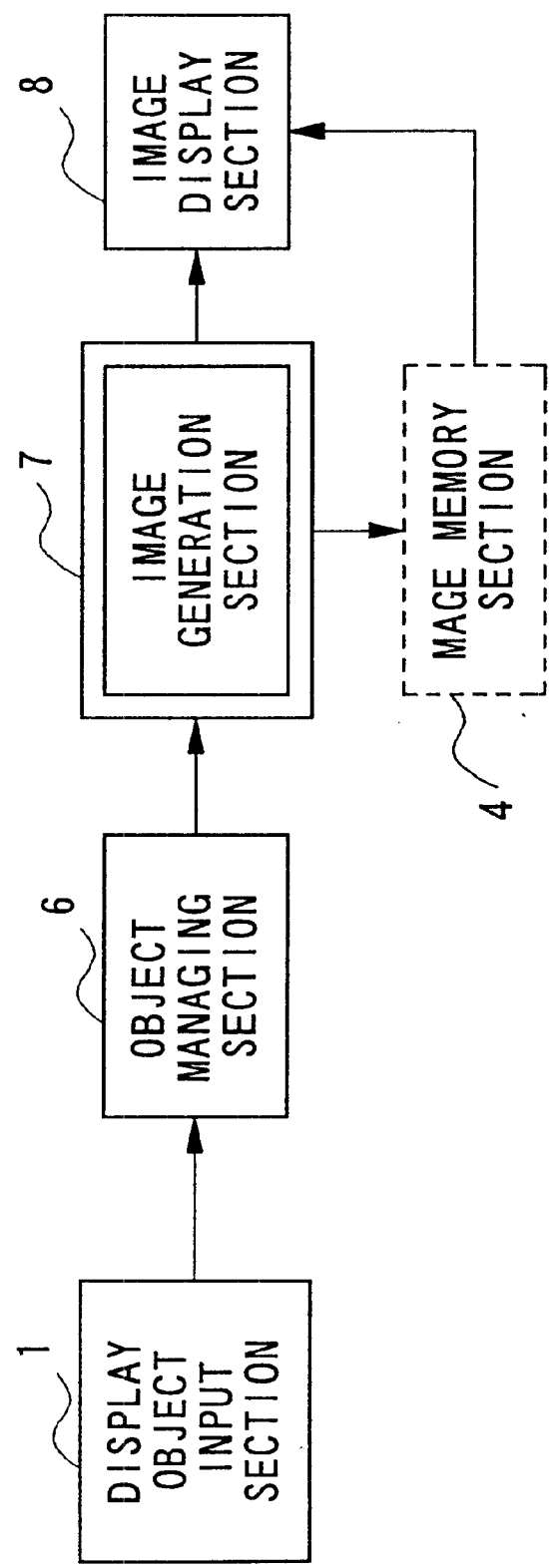
FIG. 13 is a block diagram for an apparatus for the method shown in FIG. 12.

FIG. 13 is a block diagram of an example of the computed hologram display apparatus for executing the method shown in FIG. 12. The apparatus is comprised by: a display object input section 1; an object image generation section 7; and an image display section 8. With reference to the steps shown in FIG. 12, the display object input section executes step 21, the image generation section 7 executes steps 22~24, and the image display section executes step 25.

An image memory section 4 shown in FIG. 13 is for storing the hologram images computed by the image generation section 7, and is utilized when displaying or transmitting the stored images for display. The image memory section 4 can also be used to store images temporarily while generating display images. The item managing section 6 is necessary to compose bit images when the input display object consists of a plurality of objects, and to execute bit-image synthesizing process to suit the properties of the objects.

The sections/devices indicated in FIG. 13 may be comprised by own dedicated micro-processors, or they may also be application softwares to be executed by hardwares such as memories and CPU and the like.

Detailed methodology and apparatus for Embodiments 3~6 will be discussed in the following.

Embodiment 3

First, normal methods of displaying computed holograms will be explained. In addition to the methods already mentioned (acousto-optical modulator and liquid crystal panel), the display methods include a high-precision display apparatus represented by digital micromirror device (DMD) method (refer to Larry J. Hornbeck, "Digital light processing for high-brightness, high-resolution applications", Electronic Imaging, El'97, Projection Displays III, an invited paper, 1997.) This method utilizes drive mirrors attached to those locations corresponding to individual display pixels, and the radiated beam are directed to various direction by changing the inclination of the mirrors thereby controlling the intensity (while/black) of each pixels. According to this method, intensities of each pixel are expressed digitally, and the bit arrays for individual pixels are serially displayed at a high speed, in which the bit arrays are represented by a plurality of fields. This method is, therefore, a digital display method and is generally referred to as the pulse-width modulation method.

Figure 22:
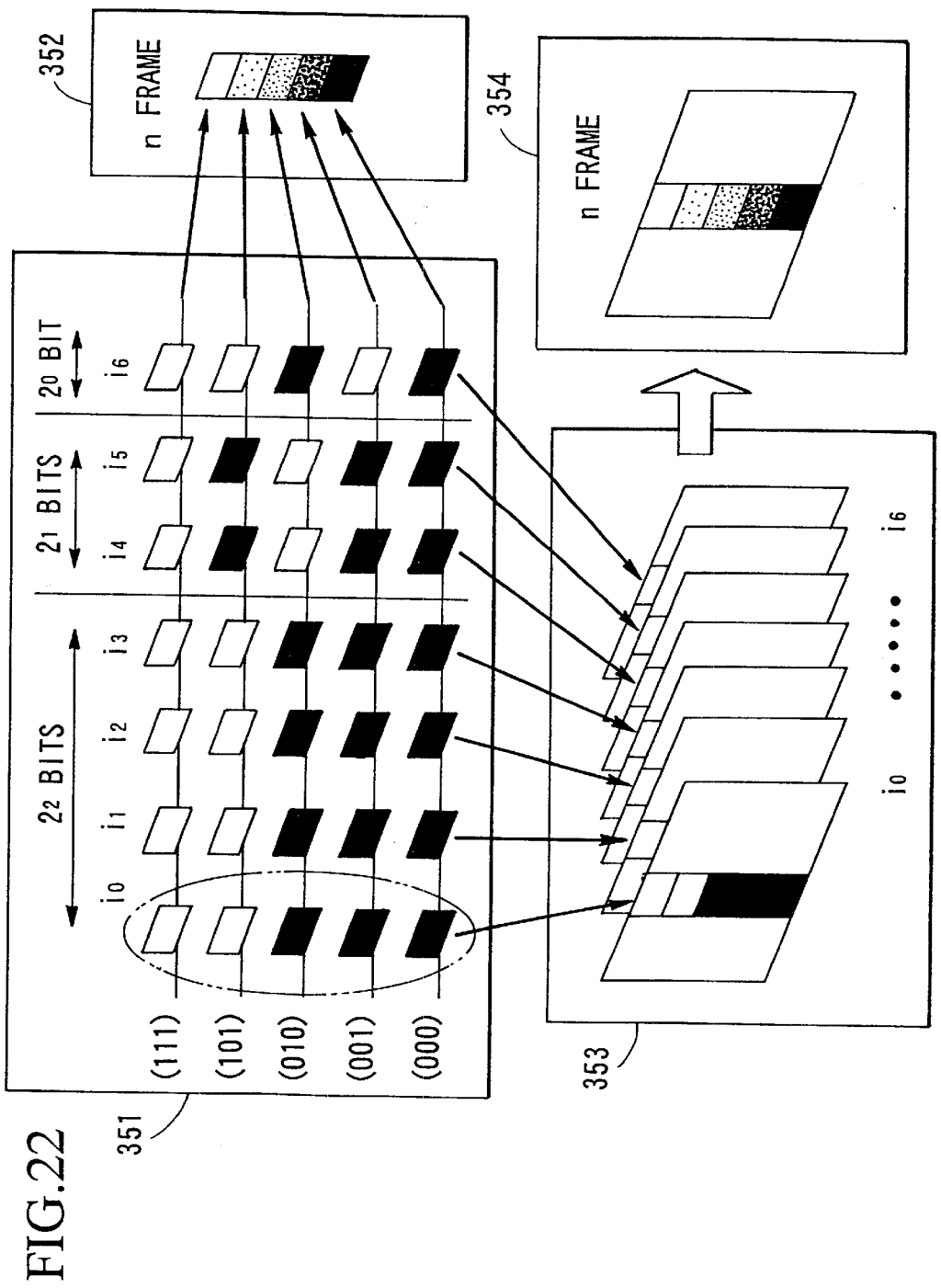
FIG. 22 is an illustration of image display according to pulse-width modulation method.

The pulse-width modulation method will be explained with reference to FIG. 22. As shown in file 351, when expressing a pixel intensity with an information content of 3-bits, the $2^2$-level bit arrays, $2^1$-level bit arrays and $2^0$-level bit arrays are presented separately in succession. For example, in binary. coding, the pixel intensity may be expressed by displaying either white (1) or black (0). Then, if the intensity in binary coding is 101, decomposed bit arrays for the $2^2$-level array will be a presentation in the sequence of white-white-white-white (i.e., 1-1-1-1), followed by black-black (i.e., 0-0) for the $2^1$-level array, followed by white (i.e. 1) for the $2^0$-level array. By assigning individual pixels to separate fields ($i_0$, $i_1$ . . . $i_6$) and presenting the images in each field sequentially, the gray levels of the individual pixels can be duplicated as shown in file 352. If the fields containing images shown in file 353 are presented sequentially, seven fields can reproduce gray level images in one frame, as indicated in file 354.

In essence, digital micromirror method based on pulse-width modulation is not a conventional analogue gradation display, but is one of the digital display methods which can express digital images directly. In the present embodiment, the pulse-width modulation method was adopted to the computed hologram display method and apparatus for displaying a plurality of items simultaneously.

The present embodiment will be presented with reference to the drawings.

Figure 14:
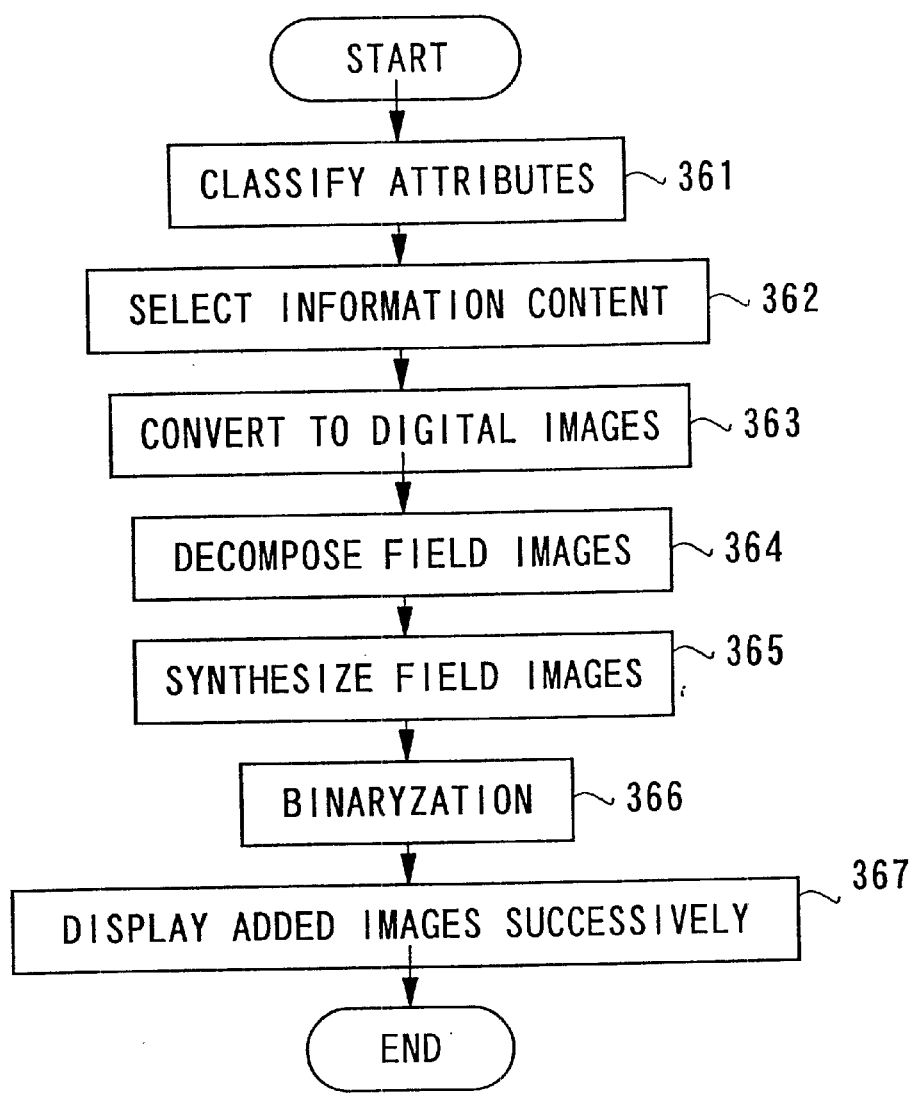
FIG. 14 is a flowchart of a third embodiment of the method of displaying holograms.

FIG. 14 is a flowchart for a method based on fields and frames. The relation of frames and fields in moving picture display will be explained in detail. A frame refers to a scene in moving pictures and is composed of a plurality of fields, where each field contains an image layer. Specifically, if each image layer in a frame is expressed by 4-bits (attribute-bits), the image layer is deblocked (decomposed) into $2^0$, $2^1$, $2^2$ and $2^3$ arrays, and the gradation is expressed by assigning a corresponding number of fields to each array such that $2_0$=1 field, $2^1$=2 fields, $2^2$=4 fields and $2^3$=8 fields, so that one frame would consist of 15 fields (=1+2+4+8).

In the beginning, data related to the objects to be displayed are entered, and individual-attributes are examined (step 361). For example, attributes are examined with reference to the following characteristics;

1) attributes of the item itself . . . surface coloring, gradations, textures etc.;
2) dynamic properties . . . shape changes, translation, rotation etc.; and
3) location of items . . . distance from the display screen etc.

Next, the amount of information complexity necessary to display the objects (number of attribute bits and gradation) are determined on the basis of the attributes of the objects (step 362). Information content necessary for expressing the objects and the attributes of the objects are pre-defined in a suitable manner, e.g. a table, and information content is decided according to such a reference. Qualitative relationships between the information content and the attributes of the objects are exemplified in the following list.

1) Attributes of the Objects Themselves

More information is needed for objects having surface coloring, many gradations and complex shapes.

2) Dynamic Properties

Less information is needed for faster changes in shape, movement and rotation.

3) Location

Less information is needed for items which are located further away from the display screen.

Explanations are provided in the following with reference to specific examples of processing a display object comprised by three items. The three items are referred to as items A, B and C with respective attributes a, b and c. It is assumed that the attribute "a" is to be expressed by 8-bit data, attribute "b" by 4-bit data and the attribute "c" by 3-bit data, and these requirements are already defined in a table to be referenced.

Next, fringe patterns generated by the wave emitted from each of the items and the reference beam are computed for each classified attribute. In this case, conversion to digital image is performed according to the gradation width in terms of the defined number of attribute bits (step 363). The digital image thus generated is expressed by a series of pixels (i, j) as illustrated in file 300, FIG. 15.

Next, each digital image is decomposed (deblocked) into respective field image arrays according to the defined number of attribute bits (step 364). In this example, the 8-bit digital images in the attribute "a" group are comprised by 255 layers, which is derived as (=128+64+32+16+4+2+1) layers of field images; the 4-bit digital images in the attribute "b" group are comprised by 31 (=16+8+4+2+1) layers of field images; and the 2-bit digital images in the attribute "c" group are comprised by 7 (=4+2+1) layers of field images.

Here, each pixel in a field image has 1-bit information, therefore, a field image may be said to represent a special case (of the bit images) formed by the attribute-bits. This type of relation between the bit images and the field images apply also to other embodiments.

File 301 in FIG. 16A relates to the field image array of item A, file 302 relates to the array for item B; and file 303 relates to the array for item C. Therefore, a k-th layer of the field image for item A would be expressed as Akij.

Figure 17:
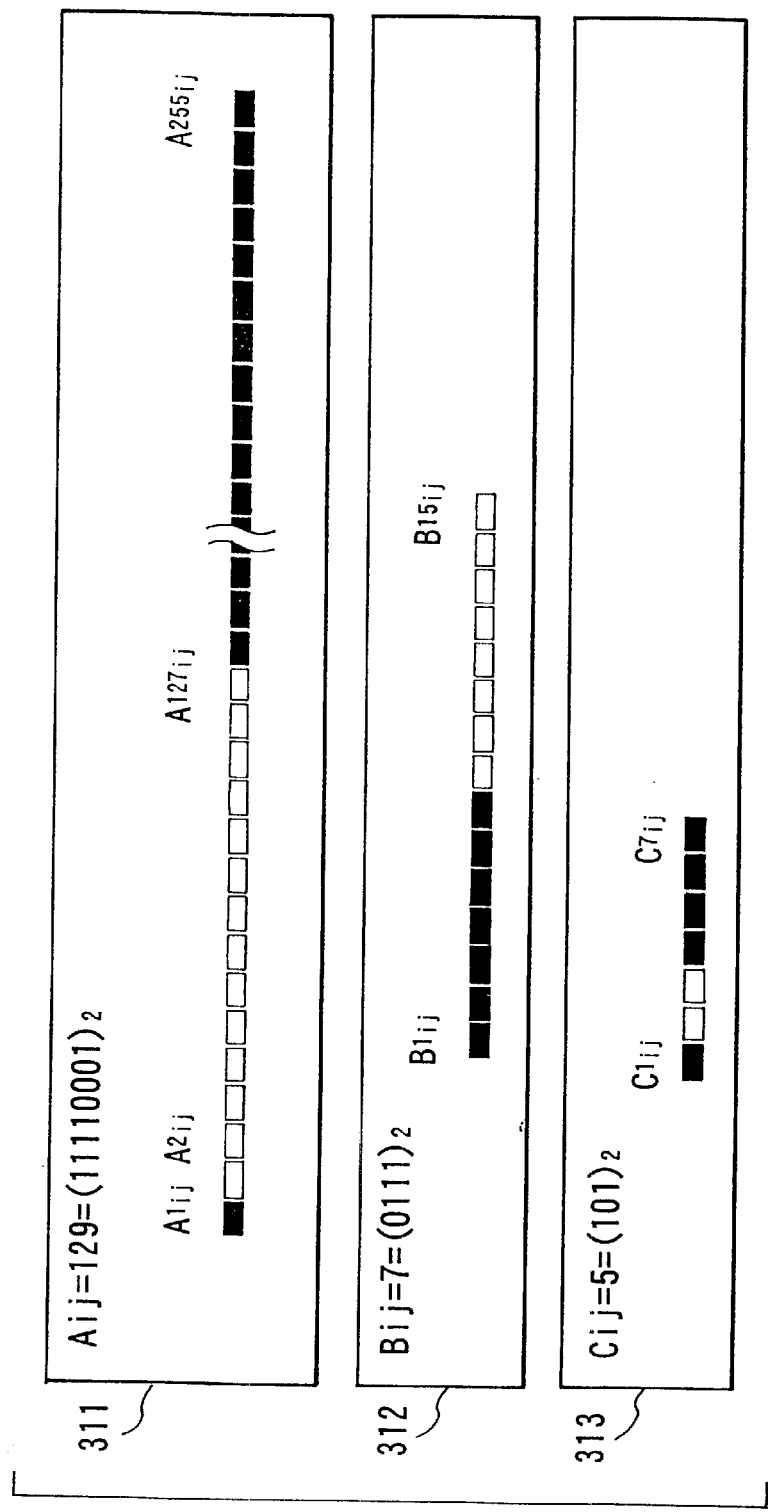
FIG. 17 is an illustration of an image (i, j) for each object extracted from a field image array.

File 311 in FIG. 17 shows an example of extracting only the pixels (i, j) in the field image array which show an intensity value of 129 [(11110001)2] for item A. In the drawing, white is (0) and black is (1). Files 312, 313 show pixels (i, j) for the intensity values of 7 and 5, respectively, concerning items B, C.

Figure 18:
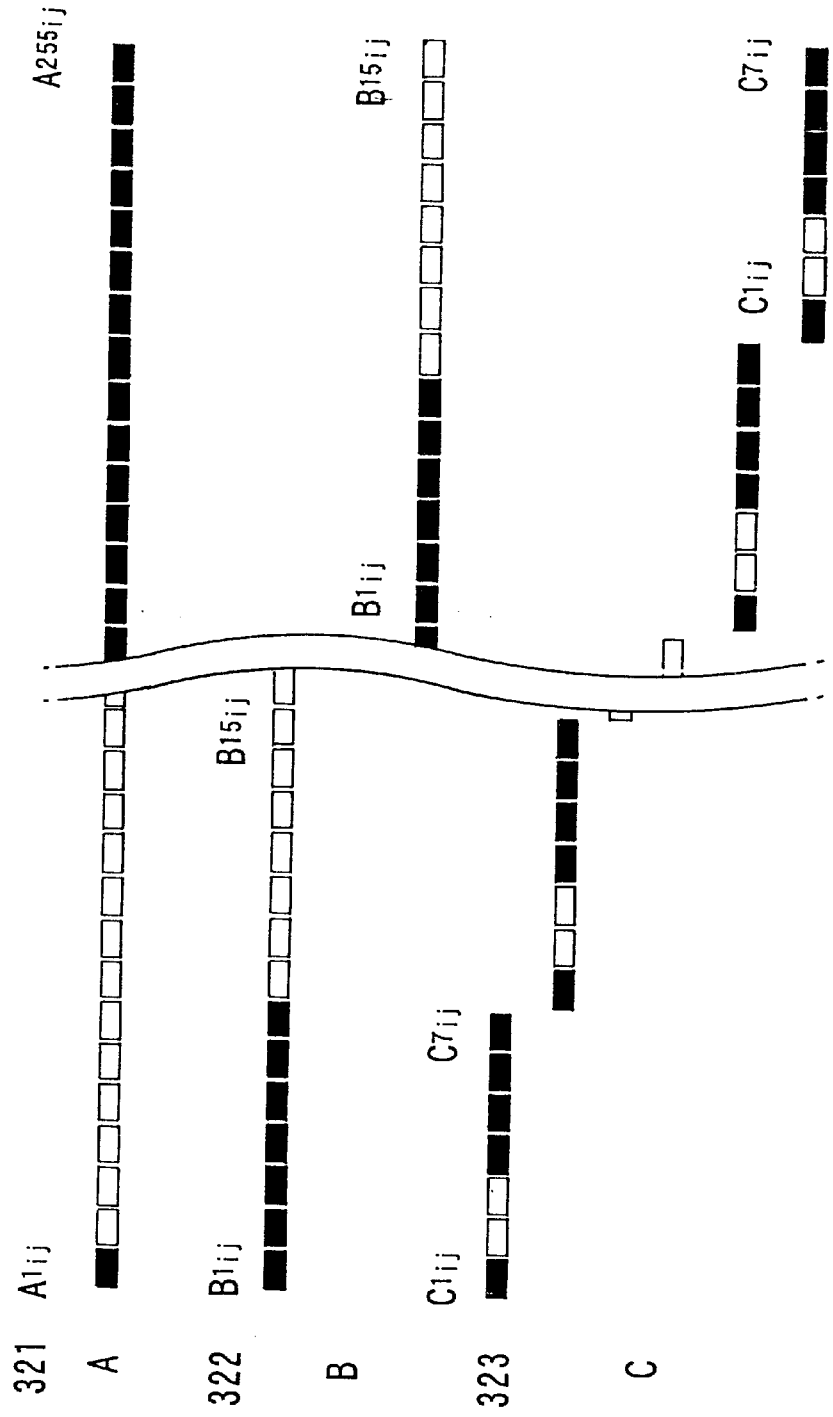
FIG. 18 is an illustration of time-display of an image (i, j) for each object image array.

In this example, it is assumed that gray scale gradations are represented by 256 levels, which means that an image requires an 8-bit gray scale, and 255 field images would be presented. If the information content is expressed in 4- or 3-bit data as mentioned above, and if only the field images generated by these attribute-bits are displayed, the intensity level of the item displayed would be extremely low. Therefore, to preserve the original intensity values of the items, intensity of each item is pre-adjusted to correspond to the number of attribute-bits, so that the intensities of items can be preserved by repeated displays of relevant field images while all the 256 field images are being presented. FIG. 18 illustrate this approach, and file 321 shows the case of displaying of item A in the display time of 255 fields, and file 322 shows the case of sixteen repetitions ($=2^7/2^4$) of item B display within the time interval for displaying item A field images to maintain the intensity value of item B, and file 323 relates to the case of thirty two repetitions ($=2^8/2^3$) of item C display within the time interval for displaying item A field images.

In other words, because item B has 4-bits and 31 fields, the number of fields are (1/16) of the that for item A. When adjusting the number of field layers to be presented to reflect the intensity properly, item B intensity is lowered by 1/16 in the field image array shown in file 302. When displaying the field images, sixteen repetitions of B field images are displayed for one display of the field image array for item A. This approach maintains the degree of intensity of item B. Similarly, for item C, the intensity is reduced during digital conversion process and display is repeated thirty two times for one display of the field image array for item A.

It should be mentioned that, because the number of field images with different bit numbers is not an integer, and fractional remainders are generated. Such fractions are discarded. Approaches such as adding to an adjoining frame and other techniques are possible, and this aspect has not been specified.

Figure 19:
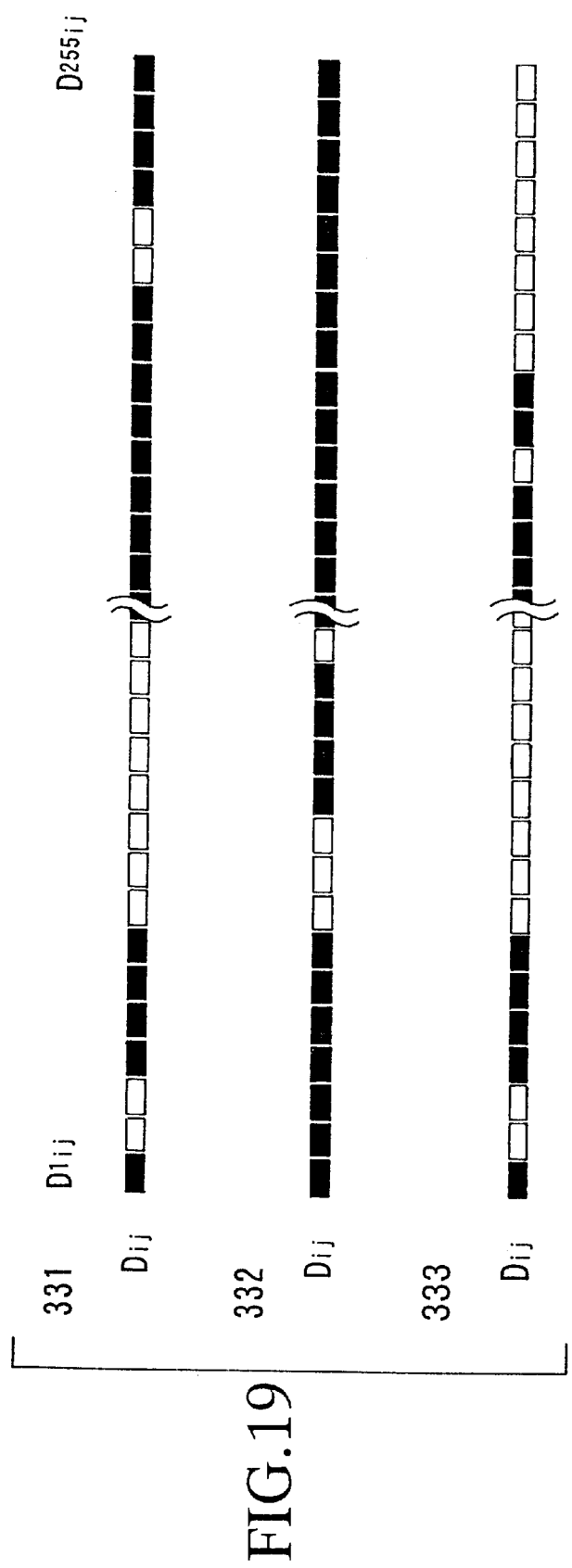
FIG. 19 is an illustration of an example of an image (i, j) in a synthesized field image array.

Next, fringe patterns from each field for simultaneous display are synthesized (added) and converted to binary coding to produce a field image array D for moving picture (steps 365, 366). Here, each binary field image before adding consists of 0 or 1, but after the addition of n layers of field images, each field image is no longer binary but is represented by n-valued coding. Therefore, they are converted back to binary data and are then processed field by field. For example, taking a pixel (i, j) in a field image array shown in FIG. 18, there are may possible processing steps such as:

1) As shown by pixel Dij in the field image array shown in file 331 in FIG. 19, only those pixels of value 2 or higher after addition are assigned a value of 1;
2) As shown by pixel Dij in file 332 in FIG. 19, a theoretical sum (OR) of individual pixels in the synthesized images are obtained; or
3) As shown by pixel Dij in file 333 in FIG. 19, obtain a theoretical product (AND) of the composite images.

It is obvious that binarization techniques are not limited to those mentioned above.

The converted dynamic field image array D are successively displayed at a high speed (step 367). The observer thus perceives an item having a span of shading because of the after image of human vision.

In this case, steps in FIG. 14 correspond to those in FIG. 12 as follows: steps 361~363 in FIG. 14 correspond to steps 22, 23 in FIG. 12, steps 364~366 to step 24, and step 367 to step 25. In FIG. 14, a step to correspond to step 21 in FIG. 12 is omitted.

An example of displaying the composite fringe patterns of the display object will be explained with reference to FIG. 12. The display object is assumed to be comprised by three items A, B and C. The presentation cycle for the display object is shown in file 341 in FIG. 20.

First, fringe patterns for each item are computed (step 22) and digitized (step 23). Here, the number of bits will not be specified in the present embodiment, but the following explanations are based on expressing all three items with 8-bit data.

Figure 20:
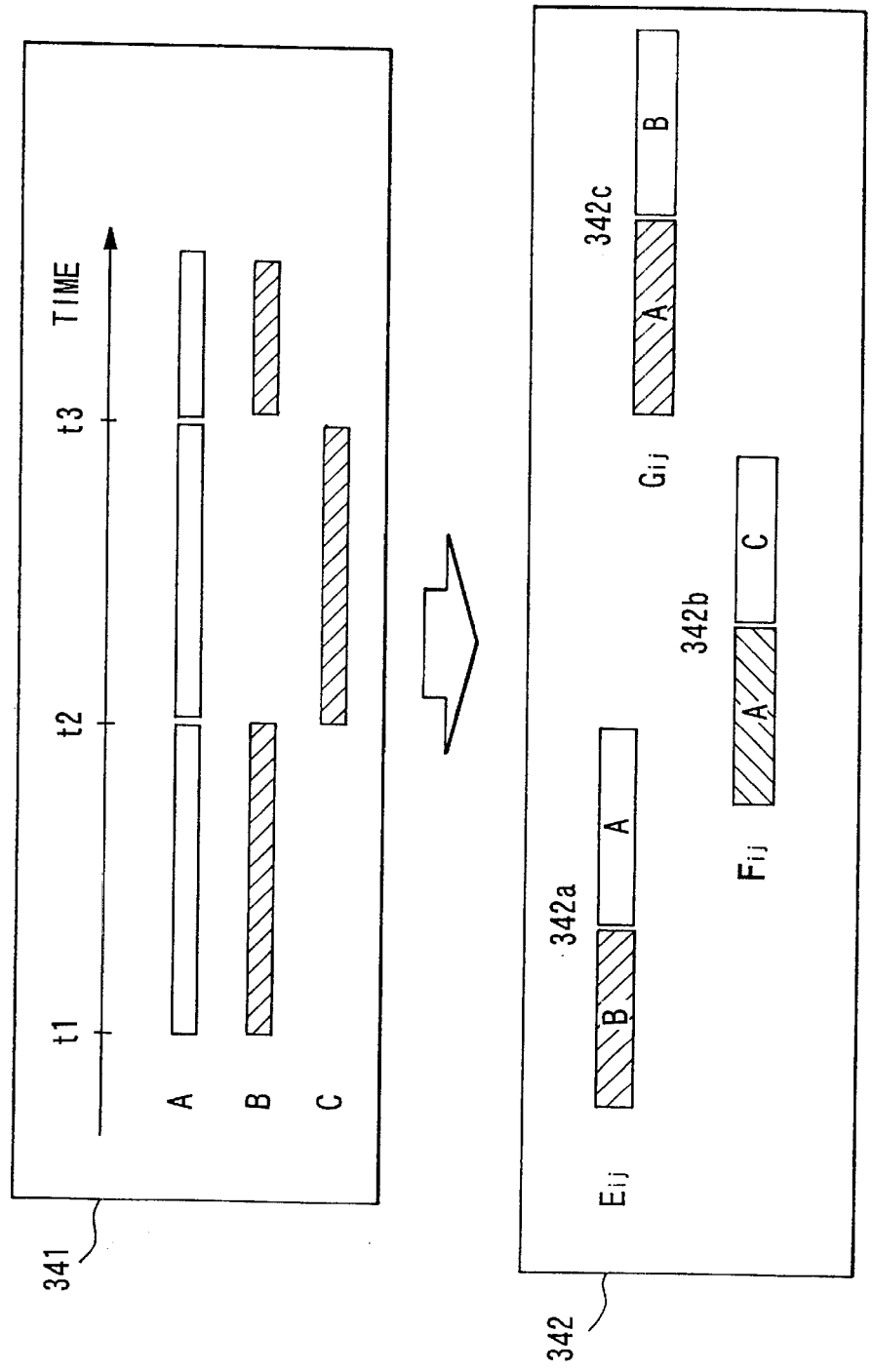
FIG. 20 is an illustration of a method of coupling specified bits of a synthesized image of different items.

As shown in file 341 in FIG. 20, items A, B are displayed during the time interval t1–t2, and items A, C are displayed during the time interval t2–t3. First, during t1–t2, digital images of fringe patterns for item A are fetched, and those for item B are also successively fetched. Then, by replacing the lowest level pixel (j, j) for image A with the highest level pixel (i, j) for image B and repeating this process for all the pixels, new digital images or successive field image arrays (for example, Eij, Fij, Gij in FIG. 20) are produced in step 24.

Specifically, the highest level bit ($2^7$ level) is left alone but for all the levels below $2^6$ are replaced with the value of image B in the $2^7$ level. The meaning of the replacement process, in terms of the pulse-width modulation method for-digital imaging, is that at the $2^7$ level, the number of field presentations is 128 times, and the total number of presentations at levels below $2^6$ is 127 ($=64+32+16+8+4+2+1$) so that about the same number of field presentations is achieved for both items A and B. This method achieves an image quality which is about equivalent to displaying items A and B at the same time. Another possible composing method is, after completing the total field image array for items A and B, to replace a half of the field image array for item A with a half of field image array for B, as indicated by field image array Eij in file 342a in FIG. 20.

Similarly, in the t2~t3 interval, a high level bit for item C is switched with a low level bit for item A, as indicated by Fij in file 342b, and in the interval beyond t3, an high level bit for item B is combined with a low level bit for item A as indicated by Gij in file 342c.

By successively displaying the moving pictures generated as explained above (step 25), a number of items can be displayed while preserving their values of intensity.

It should be mentioned that degradation in the image quality is not serious even if only the high level bits are used, but this will be explained more fully in Embodiment 6.

Demarcation between the upper and low level bits is made in the present embodiment by the upper-most level bit generated in step 23 that separates all the bits which follow. Such demarcation can be served by time demarcation or combining upper half of bits from different items, therefore, method of combining bits will not be specified.

Also, in the present embodiment, the order of fringe pattern presentations is made for individual items, but the present method is applicable so long as the presentation interval is the same (relevant field presentation frequency) for the same individual bit level during a given interval, so the sequence of field presentation at different bit levels will not be specified.

Also, the amount of items was three in the present embodiment, but this quantity is dependent on the resolution capability of the display apparatus, and this value cannot be specified in the present invention.

Also, in the present embodiment, field layers and bit numbers for each item are exemplified by numbers, but minimum/maximum field layer necessary to express an item and the number of bits necessary to display individual items are not restricted.

Also, in the present embodiment, black/white binary designations are used to display each field, but it is not necessary to be limited to such a binary coding. If the display apparatus is able to switch the fields at a faster speed than switching speeds normally used for pulse-width modulation method, multi-valued images may be used. If such approach is possible, even more items or more clear images can be realized.

Next, a configuration of the computed hologram display apparatus having the features described above will be presented in FIG. 21. The apparatus is comprised by: a display object managing section 371; a digital image processing section 372; a field image processing section 373; an image storage managing section 374; and an image display section 375. The apparatus is operated as follows.

The display objects are managed by the display object managing section 371, and are classified according to the attributes of the items. In the digital image processing section 372, those items classified by the display object managing section 371 are separately fetched to compute the fringe patterns to generate holograms, and are converted to digital images according to the bit-data for the relevant classified attributes. Digitized images are decomposed into field image arrays in the field image processing section 373 according to the bit-data, and are stored in the image storage managing section 374. The field image processing section 373 successively fetches field images from the image storage managing section 374, and produces a new field image containing a plurality of field images, and stores them in the image storage managing section 374. The image arrays stored in the image storage managing section 374 are successively displayed on the image display section 375.

Figure 21:
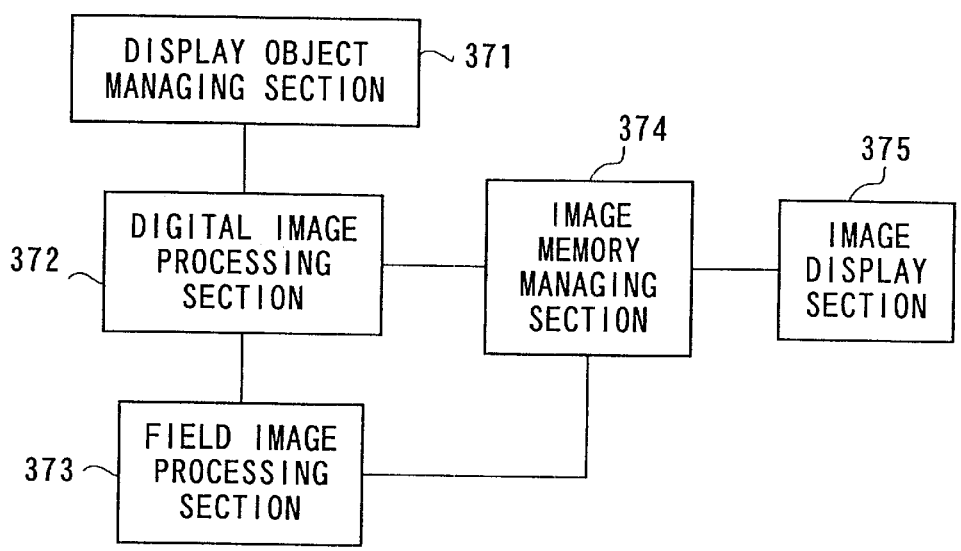
FIG. 21 is a block diagram of an apparatus for a third embodiment.

Various sections in FIG. 21 corresponds to those in FIG. 13 as follows. The display object managing section 371 in FIG. 21 corresponds to item managing section 6; digital image processing section 372 and field image processing section 373 to image generation section 7; image storage managing section 374 to image memory section 4; and image display section 375 to image display section 8.

Accordingly, the present invention enables to display more items, within a given time interval, by selecting the information content to suit the attributes of the display object (intensity, movement etc.); controlling the presentation interval according to the information content; and sequencing frames/field images as moving pictures; so that as a whole, more items are displayed even though each one screen (layer) contains fewer items. This approach enables to relax the strict resolution requirement for the display apparatus.

In summary, objects having such gray variations in textures that require a high information content are expressed by 8-bit data, for example, and those objects without such gray variations that require less information content are given a lesser-bit data (4-bit for example). Poor quality of reproduction of colors or textures are less noticeable in the images of moving objects so that a fewer number of bits is adequate to express such moving objects. Further, because the display intervals are adjusted according to the number of attribute-bits so that the information loss caused by burying effects of the added images of other items can be decreased.

In the conventional approach, if one item is expressed by 8-bit data, it is necessary to present 255 layers (=$2^7+2^6+2^5+2^4+2^3+2^2+2^1+2^0$) of fields to express one gray scale for each pixel in a digital image. That is, for all items to be displayed, it is necessary to present a uniform number of field layers. If the item is expressed in 8-bit data, 255 layers are successively displayed. The difficulty with this approach is that, if the intensity is higher than 128, the fields after the 128-th layer are always white (or 1). In other words, after the 128-th layer, field images presented do not change at all for a given time interval.

In the present invention, these no-change sections in the field image array is replaced with other images. In normal 2D-image presentation, such addition will result in noise on the display screen, but in holographic presentation of fringe patterns, information contains redundancy so that even if some portions of the fringes are lacking, there is little effect on the quality of reproduction of the images compared to normal 2D image display. By inserting information for other items into the time interval of presentation of unchanging images, it is possible to increase the number of items to be displayed.

Specifically, in the present hologram display technology, field images composed by fringe pattern data of several items are displayed as a sequence of moving pictures, in such a way that not only several items can be observed simultaneously but intermediate tones can be displayed according to light-emitting duration ratios of individual pixels in the corresponding field images.

Also, the present invention enables to display more objects than is possible by the conventional technology, because the number of display items in one frame can be reduced even when the display apparatus has a limited capability for displaying different gradations of gray scale.

Also, because the information content can be reduced, it becomes possible to reduce the information content per one field/layer or one frame, enabling a significant reduction in required memory capacity for storing holographic information.

Further, because the entire image forming process is digitized, degradation in image quality caused by synthesis of wavefronts, data compression and expansion can be prevented.

It should be noted that it is possible to observe images similar to the conventional moving pictures (based on 30 frames/s) when the field presentation period is such that an suitable number of field layers are presented within 1/30 second.

Embodiment 4

In Embodiment 3, moving pictures for display were generated by assigning frame image arrays (bit images) to a plurality of screens in moving pictures under a constraint of "preserve intensity"; in Embodiment 4, the same will be achieved by simply distributing bit images "to be assigned by distributing to a plurality of screens".

Embodiment 4 will be explained in the following with reference to the drawings.

Figure 23:
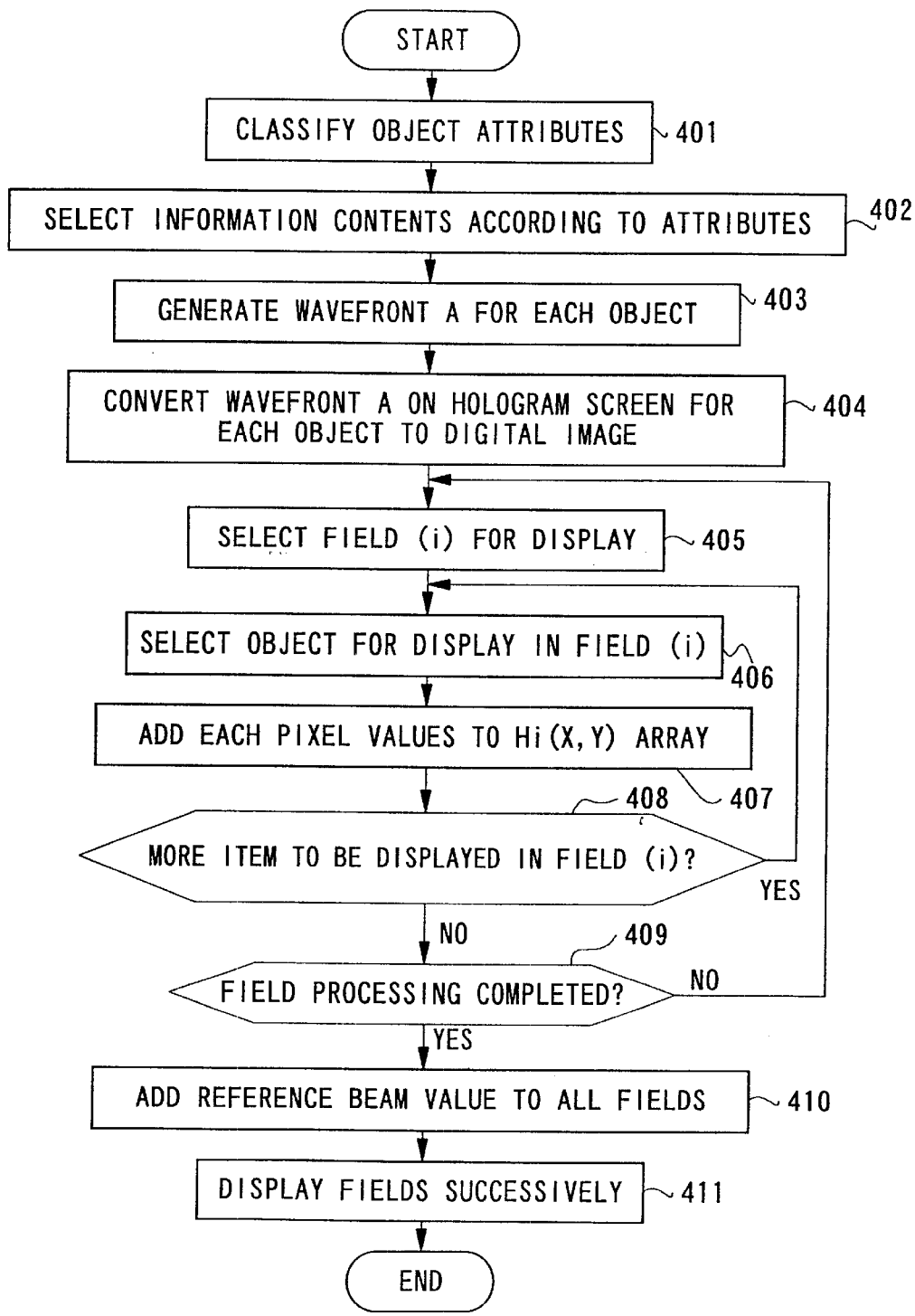
FIG. 23 is a flowchart for a display method in a fourth embodiment.

FIG. 23 is a flowchart for the present embodiment. It is assumed that a display object is a collection of point light sources. A view in the conventional dynamic display is termed a frame and a plurality of images comprising a frame are termed fields. If, for example, each pixel in one image frame is expressed by 4-bit data of attribute bits, these four bits are arranged as $2^0$, $2^1$, $2^2$, $2^3$ so that these attribute bits are distributed over a total of 15 fields such that $2^0=1$ field, $2^1=2$ fields, $2^2=4$ fields, and $2^3=8$ fields. Therefore, it can be seen that one frame consists of 15 fields.

Figure 24:
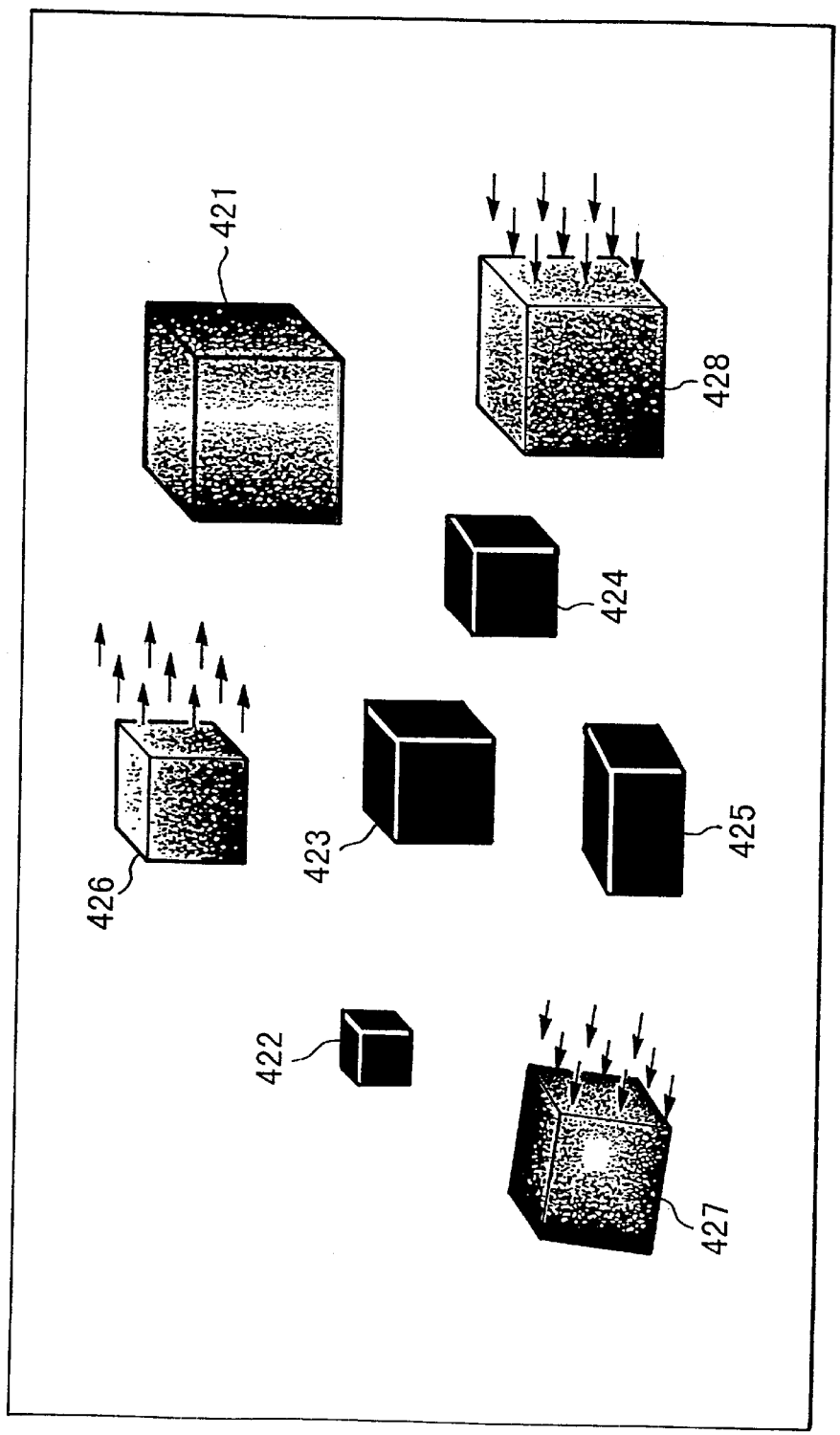
FIG. 24 is an illustration of different items to be displayed in the present embodiment.

First, to display eight objects (421 to 428) such as those shown in FIG. 24, the intended items are classified according to their attributes (step 401). For example, if the eight items are assumed to be classified according to:

(1) static objects having changes in gray scale or shading (421);

(2) static objects having no changes in gray scale (422, 423, 424, 425);

(3) moving objects (426, 427, 428).

Then, information contents for the classified items are determined (step 402). For example, items in (1) would be expressed by 4-bit data; those in (2) by 1-bit data and those in (3) by 2-bit data. This method of classification is the same as that explained in Embodiment 3.

Next, a wavefront data A#421 formed by the light source 421 on the hologram screen is computed for each those items having different shading (step 403). This item (421) requires 4-bit data and each pixel in the wavefront A#421 is converted to a 4-bit digital image, and the field image (b/w image) thus produced is stored (step 404).

Similar processing is carried out for the items under classification (2), 422, 423, 224, 425, so that wavefronts A#422, A#423, A#424, A#425, may be computed (step 403). These items can be expressed by 1-bit data so that digitization is carried out for the wavefronts A#422, A#423, A#424, A#425 and field images are produced on the basis of 1 bit-data and stored (step 404).

Similarly, the objects under classification (3), 426, 427, 428) are processed to compute wavefronts A#s 426, 427, 428, which are digitized to produce field images to be stored (steps 403, 404).

Figure 25:
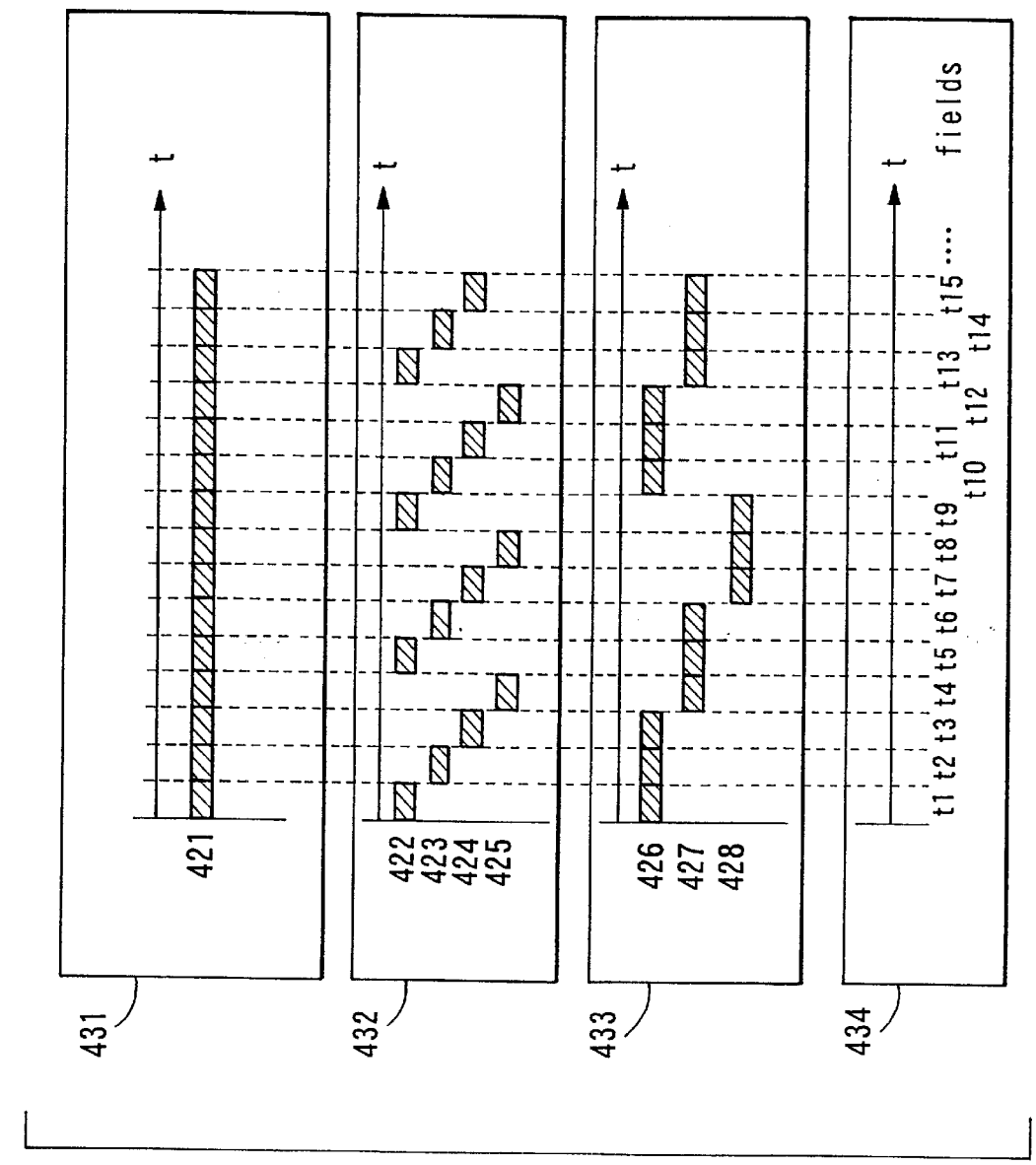
FIG. 25 is an example of display sequence for field images in the present embodiment.

Individual objects are displayed according to a display sequence such as the one shown in FIG. 25, for example. File 431 is the display sequence for item 421 (static item with shading) and uses fifteen fields. File 432 is the display sequence for items 422–425 (static item with no shading), and individual objects are shown separately so that one field contains one object. File 433 is the display sequence for items 426, 427, 428 (moving objects), and each item requires three fields of 2-bit data. File 434 is the base line for the timing sequence for display of all fields.

First, select an image to be shown at field timing t1 (step 405), and a display item 421 to correspond with field timing t1 is selected (step 406), and an image to be displayed in field-1 (an image formed by the first bit layer in the $2^3$ level) is fetched and is written into a hologram array $Ht_1$ (x, y) in step 407. Similarly, for display items 422, 426, the images to be displayed in field-1 (first layer in the $2^0$ level for item 422 and first layer in the $2^1$ level for item 426) are fetched and written into the hologram array $Ht_1$ (x, y). By repeating the above steps (steps 406, 407) in step 408, all the images to be displayed at field timing $t_1$ are produced. In other words, at field timing t1, only three items are targeted for display.

Next, images of item 421 to be displayed in field-2 (a second layer in the $2^3$ level) are fetched and written into the hologram array $Ht_2$ (x,y). Similarly, the images for display items 423, 426 to be displayed in field-2 are processed and written into the hologram array $Ht_2$ (x,y), and new wavefronts are generated at field timing $t_2$, where only three items are targeted for display.

Subsequently, similar image processing operations are carried out for all the field timings t so that a complete set of new field images synthesized by the wavefronts and the reference beam are produced (step 410) and individual field images containing three display items are successively displayed (step 411), thereby displaying all eight display items 421 to 428 inclusively.

The steps in FIG. 23 correspond to those in FIG. 12 as follows. Steps 401–403 in FIG. 23 correspond to step 22 in FIG. 12; step 404 to step 23; step 404 to step 23; steps 405–410 to step 24; and step 411 to step 25. In FIG. 23, a step to correspond to step 21 in FIG. 12 is omitted.

Figure 26:
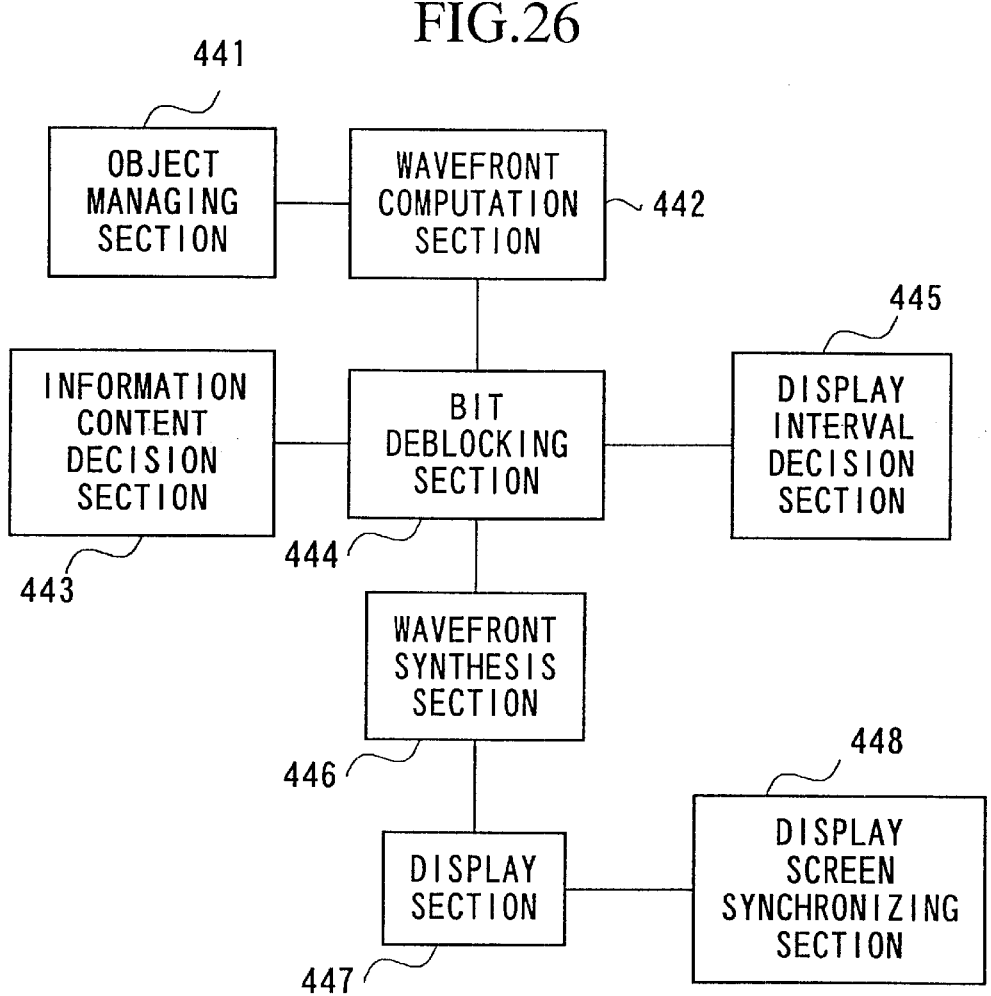
FIG. 26 is a block diagram of an apparatus for a fourth embodiment.

Next, the hologram display apparatus having the features described above will be presented with reference to a block diagram shown FIG. 26.

The apparatus is comprised by: an object managing section 441; wavefront computation section 442; an information content decision section 443; a bit deblocking section 444; a display interval decision section 445; a wavefront synthesizing section 446; a display section 447; and display screen synchronizing section 448. The operation of the apparatus is presented in the following.

The item managing section 441 manages attributes information of the display item, such as intensity, color, movement vectors of each item. The wavefront computation 442 computes the wavefronts of the individual items, each of which represents a point light source, formed on the hologram screen. The information content decision section 443 determines necessary amount of information to characterize an attribute, and digitize the items accordingly. Digitized wavefront data are managed as image arrays according to each bit-data in the bit deblocking section 444. The display interval decision section 445 manages the items contained in the fields, and selects an item to be displayed as field images. The wavefront synthesizing section 446 processes (add, for example) all the wavefronts of a selected item so that the fringe patterns of the selected item, acting as a point light source, are produced. The wavefront synthesizing section 446 computes the wavefront interference formed by the reference beam, and the results are displayed on the display section 447. The image screen synchronizing section 448 fetches wavefront so as to provide a constant interval for presenting the fields which are synchronized with the display section 447.

Sections in FIG. 26 correspond to those in FIG. 13 as follows. The item managing section 441 in FIG. 26 corresponds to item managing section 6 in FIG. 13; the wavefront computation section 442, information content decision section 443, bit deblocking section 444, display interval decision section 445, wavefront synthesizing section 446 to image generation section 7; the image display section 447, display screen synchronizing section 448 to the image display section 8. In FIG. 26, the display object input section 1 and the image memory section 4 shown in FIG. 13 are omitted.

In the present embodiment, presentation sequence of an object with shading is determined according to the sequence of bit arrays, but the present invention can be carried out so long as the presentation intervals for individual bit levels are separated at the same intervals, so the order of presentation of the fields of different bit levels is not specified.

Also, in the present embodiment, explanations are based on the number of display items as eight, but the number of display objects/items is dependent on the resolution capability of the display apparatus, and the number of displayable objects/items is not specified.

Also, the number of fields and attribute-bit data for objects are exemplified with a fixed quantity, but the maximum and minimum number of fields necessary to express an item and the information content necessary to express an item are not specified.

Also, in the present embodiment, attributes are exemplified by shading and movement, but other characteristics related to the item such as color and intensity are acceptable, and methods of classifying are not specified. Also, information content for dynamic items is fixed in the present embodiment, but the information content may be varied according to the magnitude of the motion vector.

Also, the fringe patterns produced for each item in the method and apparatus of the present embodiment can be transmitted separately to be displayed elsewhere. In this case, static items are sent first to be stored at the destination, and the moving objects are forwarded next to be combined with the static items to be displayed as a whole. This approach enables to reduce the transmission capacity required to send holographic movie images.

Also, in the present embodiment, displays in each field are expressed in binary (black/white) but it is not necessary to limit to such a binary mode. If the display device is capable of presenting images at high speeds, multi-valued images can be displayed well. By using multi-valued images, even more items or more clear image can be realized.

Also, in the present embodiment, the period of presentation of the items without shading is exemplified with one fixed period, but it is possible to vary the overall shading by controlling the cycle width. In other words, if the display interval is lengthened, the object would appear darker overall, and if the display period is shortened, the item would appear brighter overall.

Accordingly, the present invention enables to reduce the number of display object in one frame so that more items can be displayed even on a low resolution display apparatus.

Also, information content required to express one field or one frame can be reduced so that the transmission capacity can also be reduced.

Also, the overall processing is digital so that image quality degradation caused by wavefront synthesis, data compression or expansion can be prevented.

Accordingly, the present method for displaying computed fringe pattern holograms is carried out by: classifying a display object according to attributes of the items; computing fringe patterns generated by classified display objects; determining information content necessary according to attribute for each display object; digitizing the generated fringe patterns according to individual information content; deblocking bit arrays of pixels of the digitized images into pixel arrays for different bit-levels; assigning the pixels in the pixel array by distributing the pixels in a plurality of moving pictures, thereby producing digital moving pictures having a display interval varying in accordance with information content of each display object; and displaying the digital moving pictures of display objects.

The apparatus for executing the method is comprised by: an object managing section for managing information on attributes of display objects; an information content decision section for deciding information content for each display object according to attributes of the object; a wavefront computation section for computing fringe patterns for each display object; a bit de-blocking section for separating a bit array of pixels into a pixel array for different bit-levels; a display interval decision section for determining display period and display level according to the information content of each display object; and a wavefront synthesizing section for synthesizing fringe patterns generated by pixels in the pixel arrays for different bit-levels; a display screen synchronizing section for controlling display timing of fringe patterns thus synthesized; a display section for successively displaying fringe patterns composed according to a controlled display timing for each item.

Also, the apparatus may be comprised by: an image transmission section for transmitting synthesized fringe patterns for static display object first and sending fringe patterns for dynamic display objects afterwards; an image receiving section for storing fringe patterns for static display objects to be combined with successively transmitted fringe patterns for dynamic display objects; and the display image synchronizing section is used to control display timing for displaying fringe patterns produced by the image receiving section, and the display section displays the synthesized fringe patterns produced in the image receiving section.

Accordingly, the present invention enables to display more items by choosing a quantity for the information content to suit the attributes (intensity, movement etc.) of the display object; controlling the presentation interval according to the information content; and sequencing frames/field images as moving pictures; so that as a whole, more items are displayed even though each one view (image) contains less number of items. This approach enables to relax the strict resolution requirement for the display apparatus.

In other words, items having such a gray scale shading as textures that require a high information content are expressed by a high bit-level (8-bit for example), and those items without such gray variations that require less information content are given a lower-bit level (4-bit for example). Poor quality of reproduction of colors or textures are less noticeable in the images of moving objects so that a fewer number of bits is adequate to express such moving objects. Further, because the display intervals are adjusted according to the bit-level so that display objects having less information content can display more objects.

In the conventional approach, if one item is expressed by 8-bit data, the resulting digital image to express one gray scale for one pixel required a presentation of 255 layers ($=2^7+2^6+2^5+2^4+2^3+2^2+2^1+2^0$) of fields. That is, for each item to be displayed, it is necessary to present a uniform number of field layers.

However, the present invention enables to reduce the number of layers of presentation fields for lower information content (small number of bits) so that more objects than is possible by the conventional technology can be displayed within the same number of fields.

Also, by expressing each item by a bit array, and computing fringe patterns for each bit, shading in fringe patterns can be expressed in binary, black or white, so that there is no need for providing an intermediate color tone in the display device to enable simplifying manufacture of display device applicable to the present invention.

It is possible to observe images similar to the conventional moving pictures (based on 80 frames/s) when the field presentation period is such that an suitable number of layers are presented within $\frac{1}{30}$ second.

Embodiment 5

The conventional pulse-width modulation method described above is based on presenting the same binary coded images more often for binary bit images of higher bit-levels. This method of hologram display is the same as repeated presentations of binary holograms. One of the problems with the binary hologram display is that local bright spots or speckle noise are observed throughout the image. Making the matter worse for the pulse-width modulation method, when the same image is repeatedly presented, the presence of speckle noise is emphasized and the viewer perceives noisy images.

Therefore, Embodiment 5 presents a method and apparatus for resolving such a problem by preparing (adding) the digitized field image arrays (bit images) according to the attribute bits in such a way that the number of fields corresponds to the bit-level of the attribute bits, but the display images are processed using a different binarization process between the fields of the same bit-levels. By adopting this approach, the locations of speckle noise are so altered between the field images that inhomogeniety in the background shading is eliminated to produce clearer images. The embodiment will be explained in the following with reference to the drawings.

Figure 27:
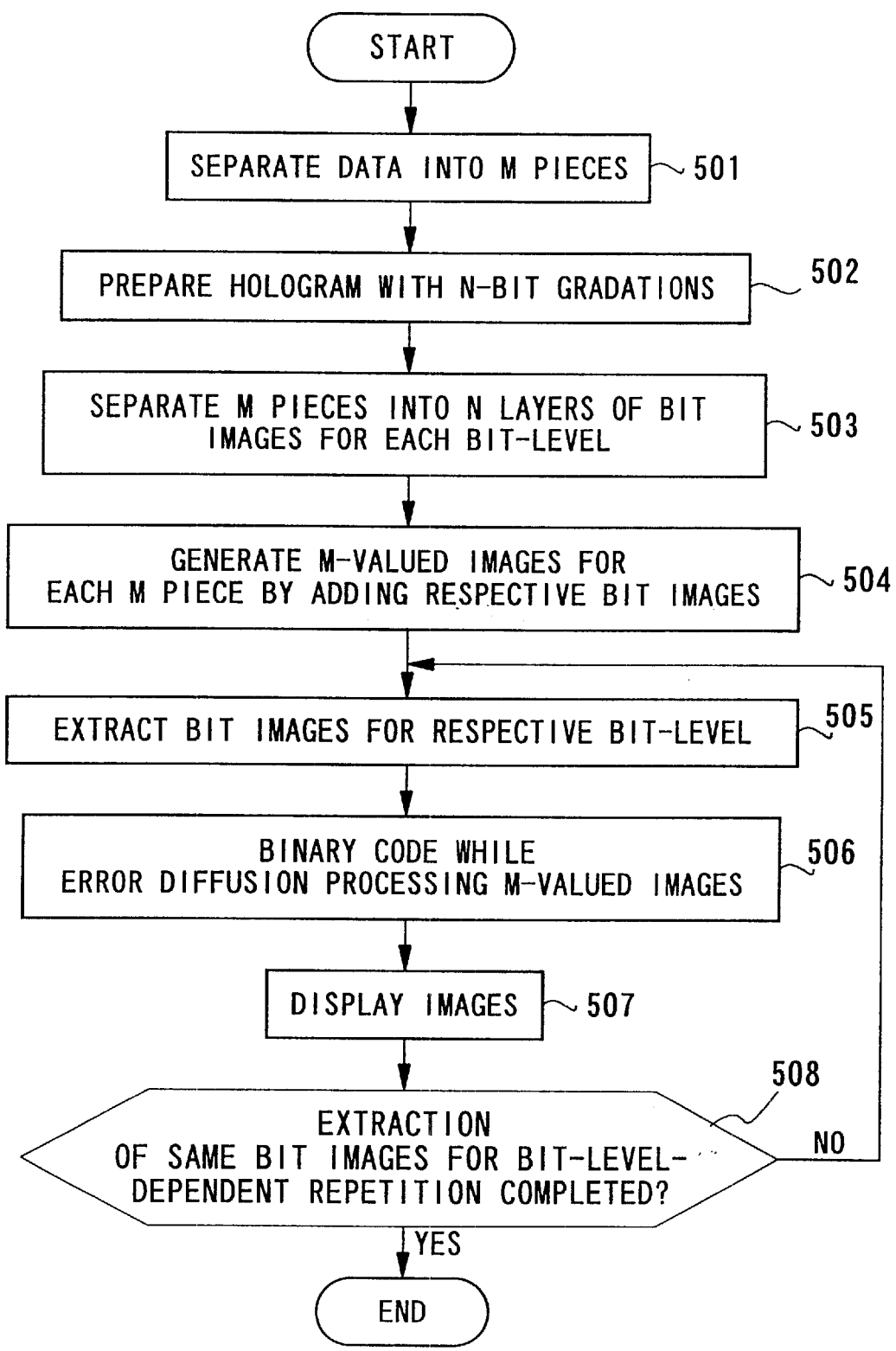
FIG. 27 is a flowchart for a method for displaying holograms in a fifth embodiment.

FIG. 27 is a flowchart of the method of Embodiment 5.

First, the data for the display objects are separated into M pieces (step 501). There would be many different techniques of separation, for example, if a display object is represented by an image layer, the image may be separated into 4 pieces, or if there are many objects in a 3D-space, each item may be separated from the other.

For each separated data, computed holograms are prepared; for example, fringe patterns having N-bit shading (e.g., 8 bit). Assume that there are M pieces of data and M layers of holograms are to be produced (step 502).

Next, because each pixel in the M-set of fringe patterns is comprised by N-bits, N layers of images are produced for each pixel in the fringe patterns of the same bit-level (step 503). In other words, for each of the M layers of fringe patterns, N layers of bit images will be prepared.

Next, because there are M layers for each bit-level, those pixels belonging to the same bit-level are added. This step produces N layers of bit images each having 0~M shading gradations (step 504).

Figure 28:
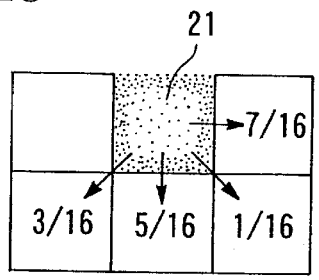
FIG. 28 is an example of weighting used in error diffusion processing.

Next, bit images are fetched serially (step 505) for processing. An example of image processing used in the present embodiment is error diffusion processing. That is, binarization (0 or M for shading value) is carried out using a threshold value of shading (N/2 for example). In performing this step, errors caused by binarization are diffused to the neighboring pixels. For example, as shown in FIG. 28, weighted values of errors for pixel 21 are added to the neighboring pixels (for example, weighting of $3/16$, $5/16$, $1/16$, $7/16$) in step 506.

In carrying out step 506, several variations in the threshold values, weighting of errors or diffusion direction are prepared, and the error diffusion processing and binarization are carried out so that the threshold value, weighting and diffusion direction are different for each image, and after this processing, the images are displayed (step 507).

Steps 505~507 are repeated by fetching the same image to repeatedly present the number of layers corresponding to the bit-level of the image (step 508). For example, if the image contains 8-bit shading, an image having the highest bit-level would be fetched $2^7=128$ times.

The steps shown in FIG. 27 correspond to those shown in FIG. 12 as follows. Steps 501, 502 in FIG. 27 correspond to steps 22, 23 in FIG. 12; steps 503~506 to step 24; steps 507, 508 to step 25. In FIG. 23, a step to correspond to step 21 in FIG. 12 is omitted.

In the present embodiment, M layers of holograms are all represented by N-bit data, but it is not necessary to limit to the same number of bits for all the layers. Layers may have a different number of attribute bits, and in this case, the number of layers equal to the maximum number of bits may be prepared (if an image has no corresponding bit, 0 or black is assigned. Or, by using bit images from other images, differences in the number of bits may be overcome).

Also, in the present embodiment, error diffusion processing and binarization are carried out in real-time at the time of displaying the images, but it is also possible to store prepared images of the same bit-level which have been pre-processed for error diffusion and binarization, so that the order of processing is not specified.

Figure 29:
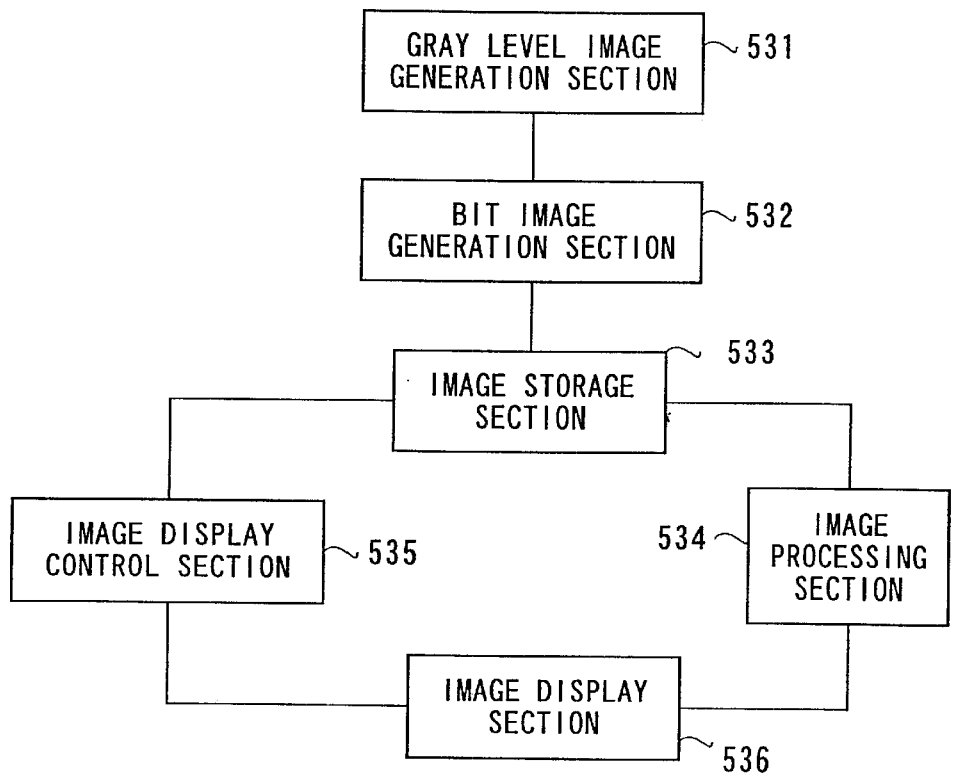
FIG. 29 is a block diagram of an apparatus for a fifth embodiment.

Next, the apparatus for executing the above method will be presented with reference to the block diagram shown in FIG. 29.

The apparatus is comprised by: a gray level image generation section 531; a bit image generation section 532; an image storage section 533, an image processing section 534; an image display control section 535; and an image display section 536. The operation of the apparatus is as follows.

First, the gray level image generation section 531 produces a computed hologram of a gray level image which is sent to the bit image generation section 532. The bit image generation section 532 decomposes the gray level image according to a pre-determined rule into a plurality of datasets (gray level images). Or, a plurality of gray level images may be generated in the image forming stage in the gray level image generation section 531, and the images are forwarded to the bit image generation section 532. The decomposed gray level images are converted to bit images in the bit image generation section 532, and are stored in the image storage section 533. The image processing section 534 performs error diffusion processing and binarization to the separated bit images, and the processed bit images are similarly stored in the image storage section 533. Or, error diffusion processing and binarization may be performed in real-time during the display process under the control of the image display control section 535 to repeatedly display the same image according to bit-levels of the image.

The structures in FIG. 29 correspond to those in FIG. 13 as follows. The gray level image generation section 531, bit image generation section 532, image processing section 534 correspond to image generation section 7 in FIG. 13; the image storage section 533 to image memory section 4; the image display control section 535, image display section 536 to image display section 8. In FIG. 26, a step to correspond to display object input section 1 shown in FIG. 13 is omitted.

Figure 30A:
FIGS. 30A~30F are examples of processed images according to the present method.
Figure 30B:
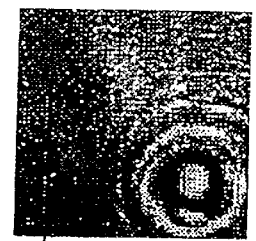
Figure 30C:
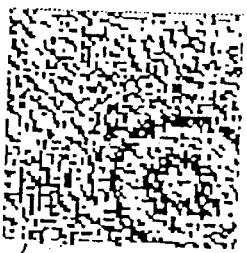
Figure 30D:
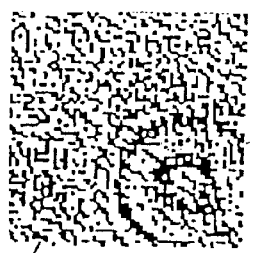
Figure 30E:
Figure 30F:
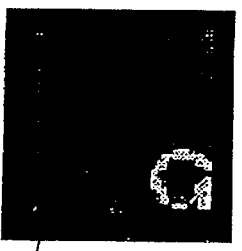

According to the control methodology described above, to display a file 540 shown in FIG. 30A, a shading fringe pattern image of a computed hologram will appear as shown by the fringe pattern image in file 541 in FIG. 30B. The fringe pattern 541 is decomposed into bits and the resulting image after binarization by different error diffusion processing techniques are shown in files 542 and 543. The features of the fringe patterns are preserved while differences in the local shading can be observed. Accordingly, even though the same original binary coded hologram is repeatedly displayed, because the binary coded image is processed with different error diffusion techniques, the locations of speckles are different for each frame during its reproduction, and the noise signals are distributed and the overall image of a higher quality is observed. File 544 shown in FIG. 30E has not be subjected to different processing frame by frame so that the speckles are emphasized and the contrast for the original image of the word G is decreased relative to a clear image containing less speckle noise shown in file 545 in FIG. 30F which is an example of an image that has been treated by the method of the present invention.

The display apparatus of the present invention is comprised by: a hard disk or other similar storage device which can store and freely retrieve image data such as holograms and its bit images; buffer memories or other related devices required when performing processes such as generation of shading images and bit images; a display device such as liquid crystal display panel for displaying images such as processed digital holograms; and an input device such as keyboard and mouse. Such devices are controlled by a computer or other similar control device according to predetermined algorithms or a sequence of steps such as that illustrated in flowchart in FIG. 1. The application programs to carry out such algorithms and steps can be recorded and distributed in readable memory devices such as floppy disk, pc card (personal computer memory card), magneto-optic disk, compact disk and digital video disk.

As described above, the present invention enables displaying of a holographic solid object as digital images so that it becomes possible to display very clear images that contain fewer speckle noises.

Accordingly, the method of the present invention is comprised by the steps of: generating a holographic image having shading gradations; decomposing the gradation values of each pixel in the gray level images into bit arrays; generating bit images according to individual bit-levels of the gray level images; processing bit images in such a way that, those bit images to be repeatedly presented for a time interval corresponding to bit-levels are subjected to different image processing procedures; and displaying bit images which have been so processed on a display device.

The apparatus to execute the method is comprised by: the shading image generation section for producing computed holograms having gradations; a bit image generation section for converting shading images into bit images; an image storage section; an image display control section for controlling a time interval for repeatedly presenting bit images of a specific bit-level; and an image processing section for providing different image processing steps for each of the repetitively presented bit images; and an image display section for displaying processed bit images.

Recording media may record application program suitable for executing the present invention for executing the steps of: generating shading images for comprising holograms having gradations described N-bits; separating gradations of each pixel of the shading image into bit arrays; generating a bit image for each bit-level of the pixels; and image processing the bit images in such a way that, those bit images, to be repeatedly presented for an interval time of presentation according to bit-levels, are subjected to different image processing procedures; and displaying images which have been so processed on a display device.

In the conventional pulse-width modulation method, the higher the bit-level the larger the number of repetitions. For example, if the images are represented by 8-bit data, the same image is presented 128 times for the highest bit-level while for the lowest bit level, only one presentation is made. Because the image presented-are binary coded holograms (b/w), noises are emphasized even more intensely, in other words, inhomogeniety in intensity (gradations) becomes more noticeable. As described above, holograms prepared as N-bit level digital images are used to generate N layers of bit images for each bit-level, and when presenting the same bit image, images prepared by different image processing procedures, including error diffusion processing, are presented so as to vary the locations of appearance of the speckles. By adopting this procedure, the higher the number of presentations of the same bit image, higher the probability of mutual cancellation of speckles, thereby enabling to reduce inhomogeniety in the background and produce clearer images.

Embodiment 6

Embodiment 6 relates to a method and apparatus for producing a plurality of digital images for displaying moving picture by extracting only the high bit-level digital images representing the attributes of a display object, and assigning such high bit-level images to a plurality of screens in the moving pictures.

The method is comprised by the steps of: computing fringe patterns for a plurality of display objects produced by the reference beam and light from each display object; converting the fringe patterns to digital images; separating bit-arrays of each pixel in digitized images into pixel arrays for each bit-level; extracting those pixels having bit-levels higher than a pre-determined bit-level from the decomposed pixel arrays; distributing those pixels extracted to a plurality of screens of moving pictures, thereby producing dynamic digital images comprised by pixel arrays of high bit-levels; and displaying produced dynamic digital images. These steps can be recorded in a recording medium in the form of programs to be read by a computer to produce holographic fringe patterns produced by light emitted by an object and a reference beam and to display digital images of the fringe patterns.

When extracting the images of higher ranking bit-levels, the level of the high bit-levels to be extracted may be varied to suit the attributes of a display object.

Also, the apparatus to execute the method is comprised by: a fringe pattern computation section; a digital image generation section for converting the fringe patterns to digital images and arranging bit-arrays of pixels into pixel arrays of different bit-levels; a moving picture generation section for selecting images of display object having higher bit-levels and generating moving picture arrays for display; and a display section for successively displaying moving pictures.

The moving picture generation section may alter the bit-level according to the attributes of a display object, when selecting pixel images of higher ranking bit-levels.

The method and apparatus of the present embodiment will be exemplified in a simulation to demonstrate that the above approach, of selecting only higher ranking bit levels in the digital images, produces images of excellent visual qualities.

The simulation studies showed that, when the fringe patterns generated by computer generated holography method are decomposed into digital images for different bit-levels and reproduced as pixel arrays for each bit-level, pixels that make a real contribution in reproducing the images were high-level bits only.

For example, a hologram produced by an image shown in file 611 in FIG. 31A produces a fringe pattern shown in file 612 in FIG. 31B. When the fringe pattern in file 612 is converted to an 8-bit digital image, and the bit-arrays for each pixel are decomposed into pixel arrays for each bit-level, the images appear as shown in file 613 in FIG. 31C. In other words, pixel arrays 6131~6138 shown in file 613 correspond, respectively, to $2^0$~$2^7$ bit-levels of the digitized images of the display object. Images reproduced using only these pixel arrays are shown in file 614 in FIG. 31C. It means that images 6141 to 6148 are produced from pixel arrays 6131 to 6138. Reproduced images for digital image display can be computed by weighting the images shown in file 614 according to the bit-levels. When the pixel arrays 6141~6148 are added with suitable weighting values to correspond with the respective bit-levels ($2^0$~$2^7$), then an image shown in file 616 in FIG. 31E is obtained.

On the other hand, the images shown in file 615 in FIG. 31D are obtained by adding images having the high level bits only, and the image 6151 is comprised by a sum of images of $2^7$ level (or image 6148 only), 6152 by $2^7$ and $2^6$ level images (a sum of images 6148 and 6147); 6153 by a sum of $2^7$, $2^6$ and $2^5$ level images (a sum of images 6148, 6147 and 6146); 6154 by $2^7$, $2^6$, $2^5$ and $2^4$ level images (a sum of images 6148, 6147, 6146 and 6145). From these results, it can be observed that by using only the images with high level bits (in this case, $2^7$, $2^6$, $-2^5$, and $2^4$), an image equivalent in quality to the image shown in file 616 can be obtained. In other words, even if the images with low level bits are discarded, there is little effect on the visual quality of the final image produced.

Therefore, the present invention enables to reproduce computed hologram by replacing lower bit level images with higher bit level images without degrading the image quality, thereby significantly reducing the information content required to produce a high quality holographic image.

The present embodiment will be presented with reference to the drawings.

Figure 32:
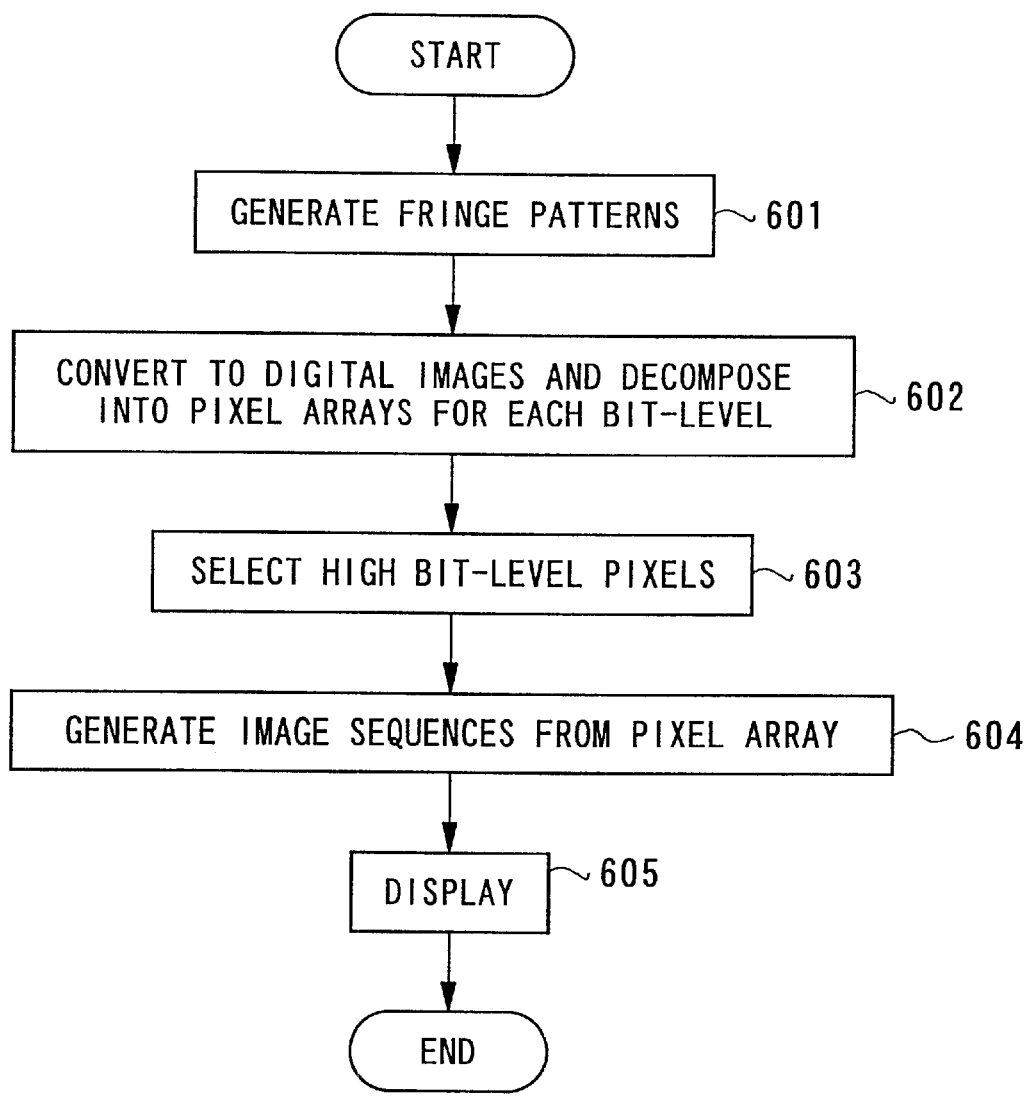
FIG. 32 is a flowchart for a method for displaying holograms in a sixth embodiment.

FIG. 32 is a flowchart for the method, and FIGS. 33A~33H show examples of the images obtained. The images are represented by 8-bit data, and two items (two images in this case) are used. For example, an original image shown in file 630 in FIG. 33A is a combination of image items "F" and "G".

First, fringe patterns are generated from the original image (step 601). file 631 in FIG. 33B shows fringe patterns generated by image F only. File 632 in FIG. 33C shows fringe patterns generated by image G only. File 633 in FIG. 33D shows fringe patterns generated by the original image 630.

If the dynamic range and resolution of the display device are sufficient, fringe pattern 633 would acceptably reproduce the original image. For electronic displays with relatively inferior resolution and display capability for intensity levels, such a fringe pattern 633 would lose fine features (high frequency components) in the reproduction. On the other hand, if the fringes are widely spaced as in fringe patterns 631, 632, electronic display device will be acceptable because there are fewer high frequency components.

Next, computed fringe patterns 631, 632 are converted to digital images, and pixel arrays for each bit-level are obtained (step 602). Image 634 in FIG. 33E and image 635 in FIG. 33F are pixel array images for each bit-level.

Next, from the pixel array images, only those images with higher bit-levels (for example, top 4 levels) are extraced (step 603), to produce image array for dynamic representation of the sets of pixel array images (step 604).

The pixel array images are serially displayed while giving weighting (step 605). Methods of weighting may include a technique of including relative intensity values corresponding to the bit-levels or adjusting the presentation time intervals for the same image according to weighting factors. The resulting image thus produced is shown in file 637 in FIG. 33H.

The steps in FIG. 32 correspond to those in FIG. 12 as follows. Step 601 in FIG. 32 corresponds to step 22 in FIG. 12; step 602 to step 23; steps 603, 604 to step 24; step 605 to step 25. In FIG. 32, a step to correspond with step 21 is omitted.

Also, in the present invention, when extracting images with higher bit-levels in step 603, it is possible to change the order of the high bit-levels to be extracted.

For example, one approach is to use images of $2^7$ level only for fringe pattern 631, and use $2^6$ to $2^0$ for fringe pattern 632. With this method, no special weighting would be necessary for the pixel array so that normal digital display processing can be used and normal digital image display apparatus can be used.

Other example would include the use of $2^7$ level only for fringe pattern 631, and $2^7$ to $2^6$ levels for fringe pattern 632.

In this case, because individual weighting operations are necessary for the pixel array images, it is necessary to control intensity and presentation interval, but high quality images are produced.

Figure 34:
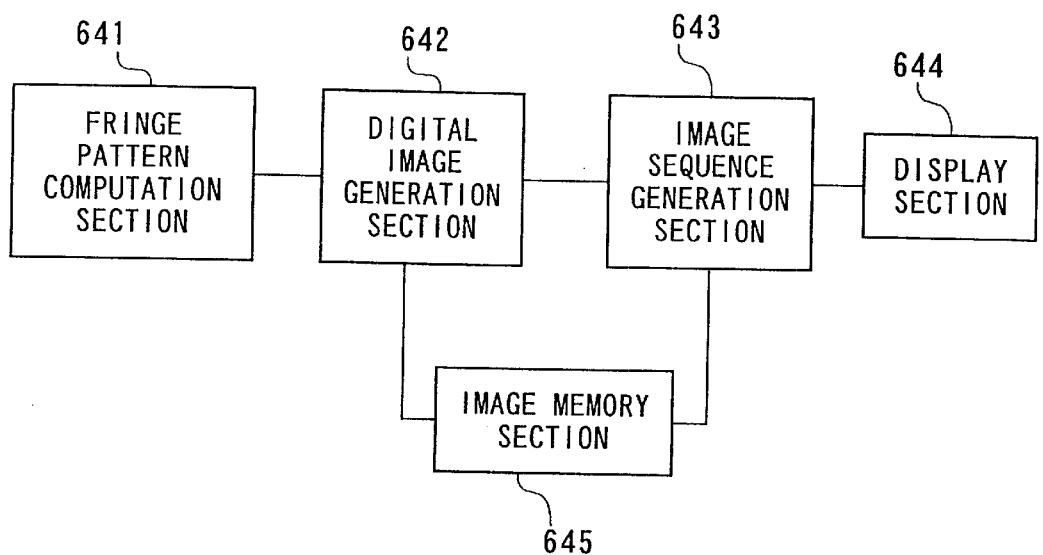
FIG. 34 is a block diagram of an apparatus for a sixth embodiment.

Next, structure and operation of the embodiment will be explained. FIG. 34 is a block diagram of an example of the apparatus for executing the method of the present invention.

The apparatus is comprised by: a fringe pattern computation section 641; a digital image generation section 642; a moving picture generation section 643; a display section 644; and an image storage section 645. The operation of the apparatus will be explained in the following.

The fringe pattern computation section 641 computes fringe patterns of the display objects (display images in this case), interference fringes produced between the display object and the reference beam (a plane wave radiated from behind the images). The digital image generation section 642 converts the fringe patterns generated by the fringe pattern computation section 641 are digitized according to the capability of the display apparatus 644 to produce images according to the bit-levels of the pixels. For example, 8-bit data may be used if the display apparatus 644 has a 256-gradations for shading, and 8 layers of pixel array images will be produced. The moving picture generation section 643 selects only those pixel images with high bit-levels from a series of pixel array images to produce moving pictures. The display section 644 displays an array of pixel array images in succession.

The structures in FIG. 34 correspond to those in FIG. 13 as follows. The fringe pattern computation section 641, digital image generation section 642, moving picture generation section 643 correspond to image generation section 7 in FIG. 13; image memory section 645 to image memory section 4; image display section 644 to image display section 8. In FIG. 34, a step to correspond to display object input section 1 is omitted.

A variation of the present embodiment would be to select a different number of pixel array images for each item in the pixel array generation section 643.

The display apparatus of the present invention is comprised by: a data reading device for obtaining data from a recording medium; a hard disk or other similar memory device and the like which stores and freely retrieves image data such as holograms and their bit images obtained from the recording medium; buffer memories or other related devices need for performing various processing tasks; a display device for displaying information necessary to perform processing tasks and displaying images such as digital holograms; and an input device such as keyboard and mouse. Such devices are controlled by a computer or other similar control device according to pre-determined algorithms or a sequence of processing steps such as those illustrated in FIGS. 31A~E,~FIG. 34. The application programs to execute such algorithms and steps can be recorded and distributed in readable memory devices such as floppy disk, pc card, magneto-optic disk, compact disk and digital video disk.

As described above, the present invention enables to reduce effective data volume by inserting image information into those images of bit levels which are not necessary.

It has been demonstrated in Embodiments 1~6 above, that the present method and apparatus for displaying computed holograms enable to reduce data volume thus allowing to display many objects simultaneously or to reduce degradation in image quality caused by superposition of fringes.

Other variations of the basic method would include a combination of the technique of displaying a plurality of items by appropriate sampling techniques presented in Embodiments 1 and 2 with the technique of designing appropriate method of composing display images presented in Embodiments 3 and 4.

It would also be possible to incorporate the technique of reducing the speckle noise presented in Embodiment 5 in those cases presented in other embodiments when a dynamic frame contains a repetition of the same image data.

It should be mentioned that various devices in the display apparatus presented in FIGS. 2 and 13 and other embodiments are equivalent to a processing section in its function.

Holograms may be computed and displayed under the control of a computer system for executing application programs recorded on readable recording medium according to the method explained with reference to FIGS. 1 and 12. Computer system in this context refers to operating systems and hardwares for peripheral devices. Readable recording medium includes such common recording devices as floppy disk, magneto-optic disk, read-only-memory (ROM), and CD-ROM and internal or external hard disk. It would also be obvious that such readable recording medium can include dynamic program storage devices, associated with network communication such as Internet and tele-communication circuits, as well as volatile memories for short term data storage in servers and network computers. The term "application programs" is generic and may consist of instructions to execute a portion of any function, or of written functions to operate in combination with programs contained in a computer system.

Fields of application of computed holography presented in Embodiments 1~6 will be mentioned briefly.

The method and apparatus for hologram display relate to a technology for displaying solid objects represented by computed holograms, and are applicable to transmission/display/storage of three-dimensional images of objects. It would be suitable as a display device for virtual reality images. Specifically, application fields would include industrial and home-based applications such as three-dimensional broadcasting at TV frequencies, museum displays, computer-aided design (CAD) systems, virtual reality computer games, and medical applications such as surgery simulations, computer tomography image display, as well as to other such solid object image display devices as headup display apparatus for a line-sight-display of solid objects.

What is claimed is:

1. A method for computing interference fringe patterns of a display object comprised by items and displaying computer generated holograms, comprising the steps of:

inputting three-dimensional data of said display object into computer means;

classifying or grouping input data and computing a plurality of fringe patterns for each classified or grouped display object;

converting said plurality of fringe patterns respectively into a plurality of digital images;

decomposing said plurality of digital images into individual bits to form bit images;

synthesizing bit images obtained for each classified or grouped display object to produce moving pictures for display; and displaying said moving pictures;

wherein computation of fringe patterns is performed by classifying said display object according to an attribute, and computing fringe patterns for each classified or grouped object; and wherein conversion to digital images include a step of selecting an information content according to attributes of said items so as to prepare bit images having a number of attribute bits related to each information content; while generation of moving pictures for display includes a step of assigning bit images for each classified or grouped object by distributing bit images to a plurality of field layers of moving pictures.

2. A method for computing interference fringe patterns of a display object comprised by items and displaying computer generated holograms, comprising the steps of:

inputting three-dimensional data of said display object into computer means;

classifying or grouping input data and computing a plurality of fringe patterns for each classified or grouped display object;

converting said plurality of fringe patterns respectively into a plurality of digital images;

decomposing said plurality of digital images into individual bits to form bit images;

synthesizing bit images obtained for each classified or grouped display object to produce moving pictures for display; and displaying said moving pictures;

wherein computation of fringe patterns is performed by classifying said display object according to an attribute, and computing fringe patterns for each classified or grouped object; and wherein conversion to digital images include a step of selecting a level of information complexity according to attributes of display items so as to prepare bit images having a number of attribute bits related to each information content; while generation of moving pictures for display includes a step of assigning bit images for each classified or grouped object by distributing bit images to a plurality of field layers of moving pictures so as to preserve intensity of displayed images.

3. A method for computing interference fringe patterns of a display object comprised by items and displaying computer generated holograms, comprising the steps of:

inputting three-dimensional data of said display object into computer means;

classifying or grouping input data and computing a plurality of fringe patterns for each classified or grouped display object;

converting-said plurality of fringe patterns respectively into a plurality of digital images;

decomposing said plurality of digital images into individual bits to form bit images;

synthesizing bit images obtained for each classified or grouped display object to produce moving pictures for display; and displaying said moving pictures;

wherein computation of fringe patterns is performed by classifying said display object according to an attribute, and computing fringe patterns for each classified or grouped object; and wherein generation of moving pictures for display is carried out by extracting bit images having high-bit levels to characterize attributes of said items, and distributing and assigning those bit images to a plurality of field layers of moving pictures.

4. A method for computing interference fringe patterns of a display object comprised by items and displaying computer generated holograms, comprising the steps of:

inputting three-dimensional data of said display object into computer means;

classifying or grouping input data and computing a plurality of fringe patterns for each classified or grouped display object;

converting said plurality of fringe patterns respectively into a plurality of digital images;

decomposing said plurality of digital images into individual bits to form bit images;

synthesizing bit images obtained for each classified or grouped display object to produce moving pictures for display; and displaying said moving pictures;

wherein said plurality of fringe patterns are converted into a plurality of digital images each of which has the same bit level, and said moving pictures are produced by adding each corresponding bit of images produced from the digital images so as to prepare a number of fields of moving pictures corresponding to each bit level, and altering coding mode of field layers in different fields.

5. A method for computing interference fringe patterns of a display object comprised by items and displaying computer generated holograms, comprising the steps of:

inputting three-dimensional data of said display object into computer means;

classifying or grouping input data and computing a plurality of fringe patterns for each classified or grouped display object;

converting said plurality of fringe patterns respectively into a plurality of digital images;

decomposing said plurality of digital images into individual bits to form bit images;

synthesizing bit images obtained for each classified or grouped display object to produce moving pictures for display; and displaying said moving pictures;

wherein generation of moving pictures is performed by extracting predetermined high-level bit images from said digital images, and assigning individual pixels of said high-level bit images to a plurality of field layers to produce moving pictures for display.

6. An apparatus for displaying computer generated holograms of a display object comprised by items, comprising:

a display object data input section for inputting three-dimensional data of said display object;

an image generation section for classifying or grouping said display object, computing fringe patterns formed by light interference of a computed wavefront with a reference beam for each classified or grouped display object, converting a plurality of computed fringe patterns into respective digital images, decomposing said respective digital images into individual bits, and forming moving pictures for display by synthesizing decomposed bits; and an image display section for successively displaying said moving pictures for display;

wherein said apparatus is further provided with an item managing section for classifying said display object according to attributes of said items; wherein said image generation section is comprised by:

an information content decision section for determining an individual information content for each display object according to attributes of said display item;

a wavefront computation section for computing fringe patterns for each display object;

a bit decomposing section for converting said fringe patterns into digital images of different levels of attribute bits and decomposing bit arrays of individual pixels into pixel arrays for each bit-level;

a display interval decision section for determining display cycles and sequence of presentation of objects according to said information content; and wavefront synthesizing section for synthesizing fringe patterns formed by pixels from said pixel arrays for each bit-level according to a predetermined sequence of display cycle and display sequence; and said image display section comprises:

a display screen synchronizing section for controlling display timing of synthesized fringe patterns; and an image display section for successively displaying synthesized fringe patterns according to a controlled display timing.

7. The apparatus according to claim 6, wherein said apparatus is provided with:

an image transmission section for transmitting images of synthesized fringe patterns for static items first and transmitting images of synthesized fringe patterns of dynamic items successively later, and an image receiving section for storing images of said static items and for synthesizing stored images of static items and successively transmitting images of dynamic items;

wherein said display image synchronizing section controls display timing for synthesized fringe patterns in said image receiving section and said image display section displays fringe patterns synthesized in said image receiving section.

8. An apparatus for displaying computer generated holograms of a display object comprised by items, comprising:

a display object data input section for inputting three-dimensional data of said display object;

an image generation section for classifying or grouping said display object, computing fringe patterns formed by light interference of a computed wavefront with a reference beam for each classified or grouped display object, converting a plurality of computed fringe patterns into respective digital images, decomposing said respective digital images into individual bits, and forming moving pictures for display by synthesizing decomposed bits; and an image display section for successively displaying said moving pictures for display;

wherein said image generation section comprises:

a fine pattern computation section for computing fringe patterns for display items;

a digital image generation section for converting a computed fringe section into a digital image and generating a pixel array for each bit-level from individual pixel bits; and an image sequence generation section for generating image arrays for displaying moving pictures by selecting high-level bit pixel arrays of items to be displayed.

9. An apparatus for displaying computer generated holograms of a display object comprised by items, comprising:

a display object data input section for inputting three-dimensional data of said display object;

an image generation section for classifying or grouping said display object, computing fringe patterns formed by light interference of a computed wavefront with a reference beam for each classified or grouped display object, converting a plurality of computed fringe patterns into respective digital images, decomposing said respective digital images into individual bits, and forming moving pictures for display by synthesizing decomposed bits; and an image display section for successively displaying said moving pictures for display;

wherein said image generation section is comprised by:
a gray level image generation section for generating holograms of gray scale images;
a bit image generation section for decomposing said gray scale images into individual bits to generate bit images;
an image storage section for storing bit images;
an image processing section for processing images in such a way that a bit image to be presented repeatedly are processed differently to another bit image to be presented repeatedly; and said image display section is comprised by:
an image control section for controlling display timing of those bit images to be repeatedly displayed according to bit-levels of attribute bits; and
an image display section for displaying processed bit images.

10. A recorded medium for use with computer means to execute computations to obtain holographic fringe patterns and display computed hologram images, comprised by programs for:

inputting three-dimensional data of a display object into computer means;

classifying and grouping said display object, and computing interference patterns for each classified or grouped display object to produce computed fringe patterns;

converting a plurality of computed fringe patterns into respective digital images;

decomposing a plurality of digital images into bit images comprised by individual bits;

synthesizing bit images obtained for each classified or grouped display object so as to form moving pictures for display; and displaying successively moving pictures thus produced;

wherein computation of fringe patterns is performed by classifying a plurality of display objects according to an attribute of each display object and computing fringe patterns for every display object in all classifications; and wherein conversion to digital images includes steps of: selecting an information content necessary to display said display object according to an attribute of each display object and converting to digital images having attribute-bits representing a selected information content; while generation of moving pictures includes a step of distributing and assigning bit images obtained for each classified or grouped display object to a plurality of contiguous screens of moving pictures.

11. A recorded medium for use with computer means to execute computations to obtain holographic fringe patterns and display computed hologram images, comprised by programs for:

inputting three-dimensional data of a display object into computer means;

classifying and grouping said display object, and computing interference patterns for each classified or grouped display object to produce computed fringe patterns;

converting a plurality of computed fringe patterns into respective digital images;

decomposing a plurality of digital images into bit images comprised by individual bits;

synthesizing bit images obtained for each classified or grouped display object so as to form moving pictures for display; and displaying successively moving pictures thus produced;

wherein computation of fringe patterns is performed by classifying a plurality of display objects according to an attribute of each display object and computing fringe patterns for every display object in all classifications; and wherein conversion to digital images includes selecting an information content necessary to display said display object according to an attribute of each display object and converting to digital images having attribute-bits representing a selected information content; while generation of moving pictures includes assigning bit images obtained for each classified or grouped display object to a plurality of contiguous screens of moving pictures so as to preserve luminance of images.

12. A recorded medium for use with computer means to execute computations to obtain holographic fringe patterns and display computed hologram images, comprised by programs for:

inputting three-dimensional data of a display object into computer means;

classifying and grouping said display object, and computing interference patterns for each classified or grouped display object to produce computed fringe patterns;

converting a plurality of computed fringe patterns into respective digital images;

decomposing a plurality of digital images into bit images comprised by individual bits;

synthesizing bit images obtained for each classified or grouped display object so as to form moving pictures for display; and displaying successively moving pictures thus produced;

wherein computation of fringe patterns is performed by classifying a plurality of display objects according to an attribute of each display object and computing fringe patterns for every display object in all classifications; and wherein generation of digital moving picture is performed by extracting those bit images having high bit-levels representing attributes of said display object from bit images obtained for each classified or grouped display object, and distributing and assigning said bit images having high bit-levels moving pictures to a plurality of contiguous image sequence.

13. A recorded medium for use with computer means to execute computations to obtain holographic fringe patterns and display computed hologram images, comprised by programs for:

inputting three-dimensional data of a display object into computer means;

classifying and grouping said display object, and computing interference patterns for each classified or grouped display object to produce computed fringe patterns;

converting a plurality of computed fringe patterns into respective digital images;

decomposing a plurality of digital images into bit images comprised by individual bits;

synthesizing bit images obtained for each classified or grouped display object so as to form moving pictures for display; and displaying successively moving pictures thus produced;

wherein conversion to digital images is performed so as to form moving pictures having a given level of attribute-bits, and said moving pictures are produced by adding bit images produced from digital images for each level of attribute-bits so that a number of field layers in a frame corresponds to each bit-level of said attribute-bits, and altering a coding mode for field layers in different fields.

14. A recorded medium for use with computer means to execute computations to obtain holographic fringe patterns and display computed hologram images, comprised by programs for:

inputting three-dimensional data of a display object into computer means;

classifying and grouping said display object, and computing interference patterns for each classified or grouped display object to produce computed fringe patterns;

converting a plurality of computed fringe patterns into respective digital images;

decomposing a plurality of digital images into bit images comprised by individual bits;

synthesizing bit images obtained for each classified or grouped display object so as to form moving pictures for display; and displaying successively moving pictures thus produced;

wherein generation of moving pictures is performed by selecting predetermined high-level bit images from said digital images, and assigning individual pixels of said high-level bit images to a plurality of field layers of moving pictures to produce moving pictures for display.

\* \* \* \* \*